United States Patent
Hurry

(10) Patent No.: US 10,497,001 B2
(45) Date of Patent: *Dec. 3, 2019

(54) MODULE ID BASED TARGETED MARKETING

(71) Applicant: Visa USA, Inc., San Francisco, CA (US)

(72) Inventor: Simon J. Hurry, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 968 days.

This patent is subject to a terminal disclaimer.

(21) Appl. No.: 15/003,477

(22) Filed: Jan. 21, 2016

(65) Prior Publication Data

US 2016/0140549 A1    May 19, 2016

Related U.S. Application Data

(63) Continuation of application No. 12/247,223, filed on Oct. 8, 2008, now Pat. No. 9,269,086.

(Continued)

(51) Int. Cl.
*G06Q 20/40* (2012.01)
*G06Q 20/08* (2012.01)
(Continued)

(52) U.S. Cl.
CPC ......... *G06Q 20/409* (2013.01); *G06Q 20/085* (2013.01); *G06Q 20/12* (2013.01);
(Continued)

(58) Field of Classification Search
USPC .................................................. 705/26.1, 64
See application file for complete search history.

(56) References Cited

U.S. PATENT DOCUMENTS 6,085,168 A * 7/2000 Mori et al. ...................... 705/17
7,155,411 B1 * 12/2006 Blinn et al. ..................... 705/40
(Continued)

FOREIGN PATENT DOCUMENTS

AU    2010202061    11/2015

OTHER PUBLICATIONS

U.S. Appl. No. 12/247,223 , "Final Office Action", dated Jun. 16, 2015, 18 pages.

(Continued)

*Primary Examiner* — Jay Huang
(74) *Attorney, Agent, or Firm* — Kilpatrick Townsend & Stockton LLP

(57) ABSTRACT

A server is operable to receive a media device identifying number (ID) and establish an association between a media device and a payment account and, in one embodiment, supports at least one of payment authorization and payment clearing based at least in part on the media device ID and the payment account. A network and system includes a payment card processor server that is operable to receive a payment authorization request and to determine if an authorized media device generated a purchase selection message and to determine to approve a received payment authorization request based, in part, if the media device was authorized for the purchase selection based upon a received media device ID. The system is further operable to perform a key rotation to protect payment account information.

23 Claims, 17 Drawing Sheets

Related U.S. Application Data

(60) Provisional application No. 60/991,146, filed on Nov. 29, 2007, provisional application No. 61/012,378, filed on Dec. 7, 2007.

(51) Int. Cl.

| | | |
|---|---|---|
| *G06Q 20/12* | (2012.01) | |
| *G06Q 20/14* | (2012.01) | |
| *G06Q 20/36* | (2012.01) | |
| *G06Q 20/38* | (2012.01) | |
| *G06Q 30/06* | (2012.01) | |
| *G07F 7/08* | (2006.01) | |
| *H04N 21/254* | (2011.01) | |
| *H04N 21/2543* | (2011.01) | |
| *H04N 21/418* | (2011.01) | |
| *H04N 21/426* | (2011.01) | |
| *H04N 21/478* | (2011.01) | |

(52) U.S. Cl.
CPC ........... *G06Q 20/14* (2013.01); *G06Q 20/367* (2013.01); *G06Q 20/3674* (2013.01); *G06Q 20/382* (2013.01); *G06Q 20/3829* (2013.01); *G06Q 20/40* (2013.01); *G06Q 20/401* (2013.01); *G06Q 20/4012* (2013.01); *G06Q 20/4014* (2013.01); *G06Q 20/4037* (2013.01); *G06Q 30/0601* (2013.01); *G07F 7/08* (2013.01); *H04N 21/2542* (2013.01); *H04N 21/2543* (2013.01); *H04N 21/4182* (2013.01); *H04N 21/42684* (2013.01); *H04N 21/47815* (2013.01)

(56) References Cited

U.S. PATENT DOCUMENTS

| | | | |
|---|---|---|---|
| 7,983,994 | B2 | 7/2011 | Hurry |
| 2004/0193553 | A1* | 9/2004 | Lloyd et al. ............... 705/78 |
| 2006/0153387 | A1* | 7/2006 | Lee et al. ............... 380/277 |
| 2006/0224513 | A1* | 10/2006 | Kawamoto et al. ............ 705/50 |
| 2006/0249576 | A1* | 11/2006 | Nakada et al. ............... 235/382 |
| 2008/0016001 | A1* | 1/2008 | Nakano et al. ............... 705/58 |
| 2009/0138366 | A1 | 5/2009 | Bemmel et al. |
| 2009/0144202 | A1 | 6/2009 | Hurry |

OTHER PUBLICATIONS

U.S. Appl. No. 12/247,223 , "Final Office Action", dated Nov. 9, 2011, 20 pages.
U.S. Appl. No. 12/247,223 , "Non-Final Office Action", dated Nov. 14, 2014, 16 pages.
U.S. Appl. No. 12/247,223 , "Notice of Allowance", dated Oct. 15, 2015, 8 pages.
AU2010202061 , "First Examiner Report", dated Oct. 1, 2014, 4 pages.
AU2010202061 , "Notice of Acceptance", dated Jul. 10, 2015, 2 pages.
AU2015246170 , "First Examiner Report", dated Oct. 18, 2016, 2 pages.

\* cited by examiner transaction authorization system 10 system 80 network
170 network 140 system 200 system 250 system 310 system 350 system 500 system 700 system 750

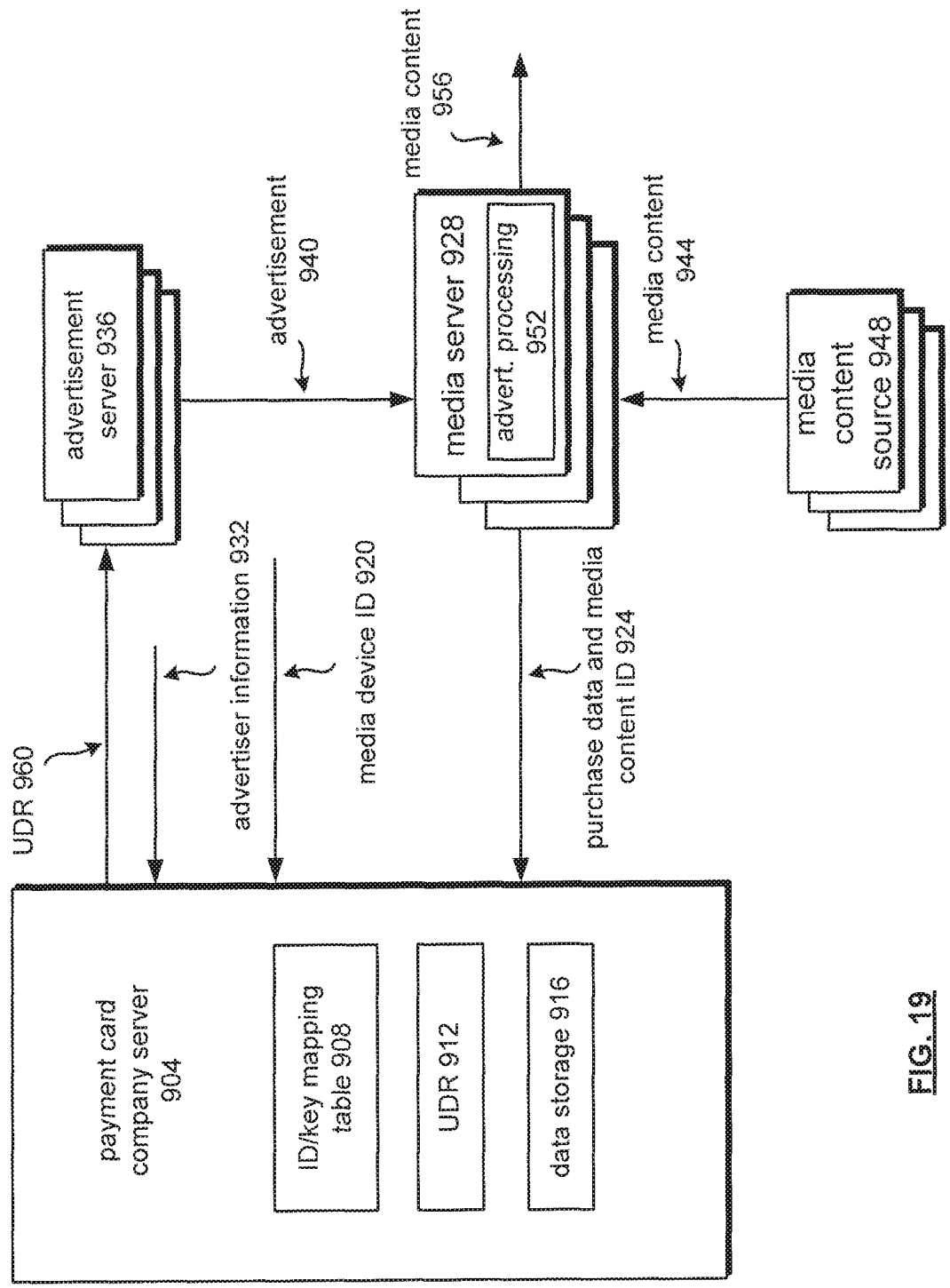

MODULE ID BASED TARGETED MARKETING

CROSS-REFERENCES TO RELATED APPLICATIONS

This application is a Continuation Application of Nonprovisional application Ser. No. 12/247,223, filed Oct. 8, 2008, and which claims the benefit of Provisional Application Nos. 60/991,146, filed Nov. 29, 2007 and 61/012,378, filed Dec. 7, 2007, the disclosures of all applications being incorporated herein by reference.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

The present invention relates to systems, devices and method that facilitate electronic commerce transactions.

Description of Related Art

Consumers, product and service merchants, purchasing and sales agents, suppliers, manufacturers, credit card and debit card companies and banks have all seen process improvements including improved payment processes due to advances in electronic commerce technology. Buyers can now find desired products through Internet searches and can purchase goods and services through secure online channels. Transactions may be processed almost instantly leading to faster delivery of the purchased item, media content, or service.

One aspect of such transactions is the common concern of theft of payment account information. Accordingly, e-commerce systems typically include, when the user chooses to make a purchase, the establishment of an encrypted tunnel between the merchant and the customer so that payment account information may be transmitted safely. Typically, a secure page is provided to the customer to prompt the customer to enter a payment account number and other required account information. A merchant server then validates the account information as a part of completing the transaction. Thereafter, a purchase confirmation is generated in one of a variety of formats to the customer.

In addition to the advances in e-commerce, the Internet is also changing the way that television is being watched. As Internet storage capacity and throughput have increased, and user terminal memory and data processing technology has advanced, media servers now deliver streaming video at a data rate that provides resolution and quality comparable to broadcast/cable/satellite television. Media servers now transmit streaming video having content similar to that provided by prior television services.

Along similar lines, Internet Protocol television boxes have been developed that support the display of streamed media and other data received over the Internet on a television. Accordingly, the manner in which television and other media content are delivered may undergo a dramatic change and may even result in a decoupling of program scheduling and viewer enjoyment. Moreover, the interactive nature of personal computers and other Internet Protocol based systems may allow for more interaction between a user and the media and advertisements viewed on a display device.

As is known, advertisements displayed on a computer terminal include tags that are used to track user interest and to give credit to a particular web page provider for generating a positive response to the advertisement. While television advertisements are unidirectional broadcasts and provide no direct feedback that allows a merchant or television broadcaster to determine consumer interest, Internet based advertisements are interactive as associated scripts are operable to indicate whether a user selected an advertisement for closer review and even whether the user purchased a product in response to the advertisement using the e-commerce transaction technology mentioned before. E-commerce and its payment processes, however, are currently setup to only support transactions that result from shopping activities in a physical or virtual store that often result from the unidirectional broadcast advertisements and web-based product and service searches.

FIG. 1 is a functional diagram that illustrates a payment card authorization process that can support a typical e-commerce transaction according to the prior art. As may be seen, a cardholder initially presents a payment card to a merchant. Specifically, the card is presented to a point of sale terminal or, as described previously, the account information is presented to the terminal through secured data entry over the Internet. Thereafter, the merchant produces card and payment information to an acquirer server. An acquirer is a payment card association member that initiates and maintains relationships with merchants that accept payment cards. Thereafter, the acquirer server produces an authorization request to a payment card company for review. The payment card company then sends the authorization request for review to the appropriate payment card issuer. The payment card issuer then issues an approval or denial that is propagated back to the merchant.

BRIEF DESCRIPTION OF THE SEVERAL VIEWS OF THE DRAWINGS

FIG. 19 is a functional block diagram of a system for generating user data reports according to one embodiment of the invention.

DETAILED DESCRIPTION OF THE INVENTION

Figure 2:
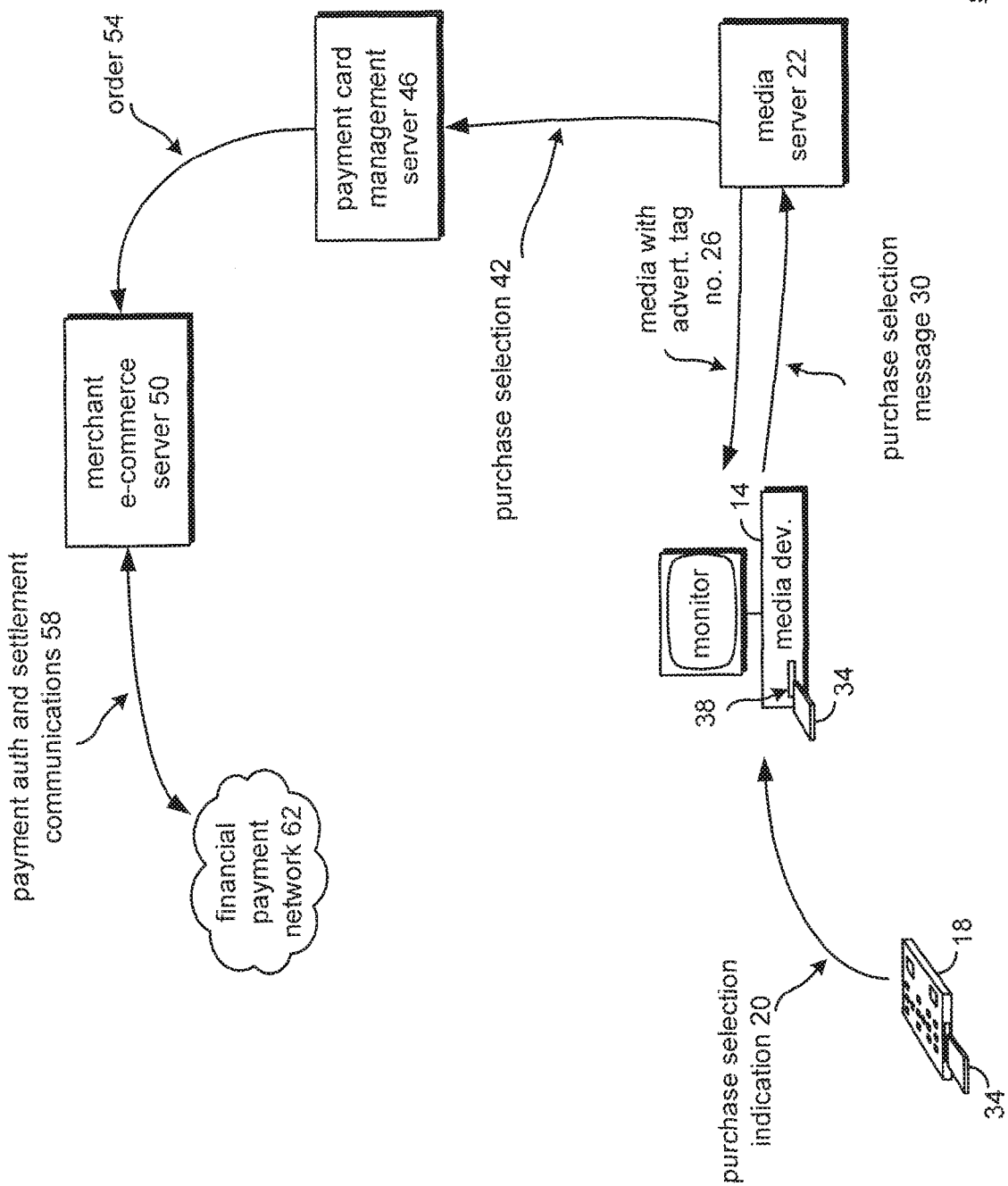
FIG. 2 is a functional block diagram of a system 10 that illustrates a process flow for a system to implement a "buy it now" feature according to one embodiment of the invention.

FIG. 2 is a functional block diagram of a system 10 that illustrates one embodiment of a process flow for a system to implement a "buy it now" feature. The "buy it now" feature supported by the systems, networks, devices and methods of the various embodiments of the invention allow a user to initiate a purchase of an advertised item by interaction with a media device that has an established association with a payment account without requiring the user to manually enter necessary payment account information. Merely pressing the "buy it now" button triggers an authorization and subsequent settlement process based upon stored payment account information that is associated with the media device. The media device may be a cable television set top box, a satellite television set top box, an IP television (IPTV) set top box, a personal or laptop computer, or an IP game box capable playing interactive games over the Internet. Any device such as an IPTV set top box, IP game box or other device operable to receive media over the Internet is included in references to IP media devices (IPMDs, media devices).

To achieve this functionality, devices, systems, networks, and/or associated method steps generally support a process to generate a payment account that has an established association with a specific media device. References herein to a media device are references to any type of device that can communicate over an IP network, a public network including the Internet, cable TV, satellite TV networks, and other types of networks that support data communications. The payment accounts may be card based in the form of a plastic bank card, a smart card, a dedicated SIM card, or may be in an electronic format and not require a physical form factor (i.e., electronically stored and encrypted account information). Additionally, while the embodiments shown typically refer to a hardware media device it should be understood that a software based module that operates with generic hardware (for example, a personal computer) may serve as the media device described that supports operation described in relation to at least one of the embodiments of the invention.

Generally, the system and processes described with reference to FIG. 2 illustrate a process that with which a set top box or other media device supports a purchase transaction using a "buy it now" operation, e.g., button selection, wherein the purchase transaction is made by an authorized media device.

More specifically, the system 10 includes a media device 14 that communicates over a wireless communication link with remote control 18 (though a remote control is not required) to receive a purchase selection indication 20 from remote control 18. Generally, purchase selection indication may comprise a signal in any form including one that includes a defined message. Media device 14 is operably coupled to receive streaming media content from a media server 22 and to provide content interaction indications to media server 22 based on receiving purchase selection indication 20. For example, the content interaction indications may include user activation of a "buy it now" feature (generically, a "purchase selection") for products, services and media advertised within the media content.

Media device 14 may be coupled to receive the media content over a computer network, a data packet network, a cable network, a satellite network, or a traditional broadcast television network. Media device 14 may also receive, simultaneously or separately, media via a plurality of transmission channels. For example, media server 22 may receive broadcast television programming over a cable network cable connection or as a wireless broadcast transmission received via an antenna. The media server 22 may convert the received broadcast transmission programming to a packet format for delivery to media device 14 via a data packet network or a computer network. In addition, media server 22 may deliver media received from other media sources to media device 14 over the data packet network or the computer network.

Media server 22 produces media with advertising and other purchase options (collectively "advertisement") with a tag number 26 to media device 14 for display upon an associated monitor or display. A purchase selection by the user by interaction with remote control 18 in response to an advertisement results in media device 14 generating a purchase selection message 30 that includes tag number 26 identifying a specific advertisement or media source. In the described embodiment, remote control 18 includes a dedicated button, the so called "buy it now" button that, when depressed, prompts remote control 18 to transmit signals to further prompt media device 14 to transmit purchase selection message 30 as a purchase selection indication.

Payment account information is stored by a smart card 34 that is inserted or installed into a receiving port 38 of media device 14. The payment account information includes traditional payment card data such as track 1, track 2, track 3, magnetic stripe equivalent data (MSD), or payment data conforming to the Europay MasterCard Visa (EMV) specifications identifying information of a traditional payment card magnetic strip. As is known by one of average skill in the art, a traditional payment card magnetic strip includes a plurality of tracks of data, while smart card based payment cards may additionally include MSD or EMV data. One particular prior art format includes three tracks wherein the data on tracks 1 and 2 is formatted by most cards in a consistent manner to improve global readability while track 3 data has not been implemented in such a constant format. Here, tracks are not used as such data is stored in memory.

The type of data from the common formats for track 1 and track 2, however, are exemplary of the data stored within smart card 34. The types of data stored by smart card 34 may include the magnetic stripe equivalent data of Track 1 and Track 2 (MSD) or a payment account number, account or card expiration date, usage limits including purchase amounts or totals, a permanent ID of an authorized device that has an established association with the payment account, issuer ID, payment account processor ID, and personal identification number. Additionally, in one embodiment, a user mailing address and a user billing address is included. The payment account processor is a company that processes payment account transactions. Historically, such processing has been on the behalf of payment card issuer companies such as banks and other financial institutions. Accordingly, media device 14 is operable to retrieve the account information from smart card 34 and to produce the payment account information within message 30.

Generally, a form factor and associated interface of smart card 34 and port 38 may include any known topology or structure including wireless communication interfaces. For example, smart card device 34 in FIG. 2 may comprise a contact less device using any known wireless radio transceiver circuitry including wireless local area network circuitry, personal area network circuitry, radio frequency identification (RFID) circuitry, etc. The receiving port in media device 14 would include a compatible transceiver circuitry. Any known protocol may be used to support such wireless interface. For example, the smart card 34 and the receiving port 38 may include logic and circuitry to support a contact less protocol such as a near field communications (NFC) protocol. One particular protocol, for example, includes the ISO/IEC Joint Technical Committee1 protocol known as ISO/IEC 14443. Thus, a wireless communication link may be used to communicatively couple smart card 34 to media device 14 to allow media device 14 to receive payment account information from smart card 34. Moreover, while the described embodiment includes the media device 14 having port 38 to receive smart card 34 with the payment account information, it should be understood that an alternate embodiment includes remote control 18 having a port to receive the smart card 34. As with the media device 14, a port within remote control 18 may also be of any known topology or structure.

In an alternate embodiment in which a payment account is not associated with a physical form factor such as a plastic credit card or SIM card, a payment account secured software module may be installed into the media device to support the "buy it now" feature. In such case, the media device 14 or remote control 18 may be uniquely identified to support the "buy it now" feature.

The media device 14 includes an identifying number that is a permanent identification number of the media device 14. For example, the media device 14 identifying number may be a serial number assigned to media device 14. One aspect of this identifying number is that the number is non-modifiable. In an alternate embodiment in which a media device comprises a software based module containing the payment account information (for example, one installed in a personal computer), the media device identifying number is a non-modifiable identification number associated with the software based media device.

In response to receiving purchase selection message 30, media server 22 transmits message 42 to a payment card management server 46. Message 42, which operates as a purchase selection indication, includes the media device ID, tag number 26, and the payment account information. Message 42 may be the same as purchase selection message 30 or may be different but based upon message 30. Message 42 may include additional information such as a shipping address associated with the payment account. Payment card management server 46 then determines a corresponding merchant e-commerce server 50 based upon the tag number and transmits an order 54 to merchant e-commerce server 50. Here, order 54 is one for which payment has not yet been authorized or approved. Merchant e-commerce server 50 then engages in payment authorization and settlement communications 58 with a financial payment network 62 to complete the transaction and, more specifically, to initially receive payment authorization and subsequently payment settlement.

Figure 3:
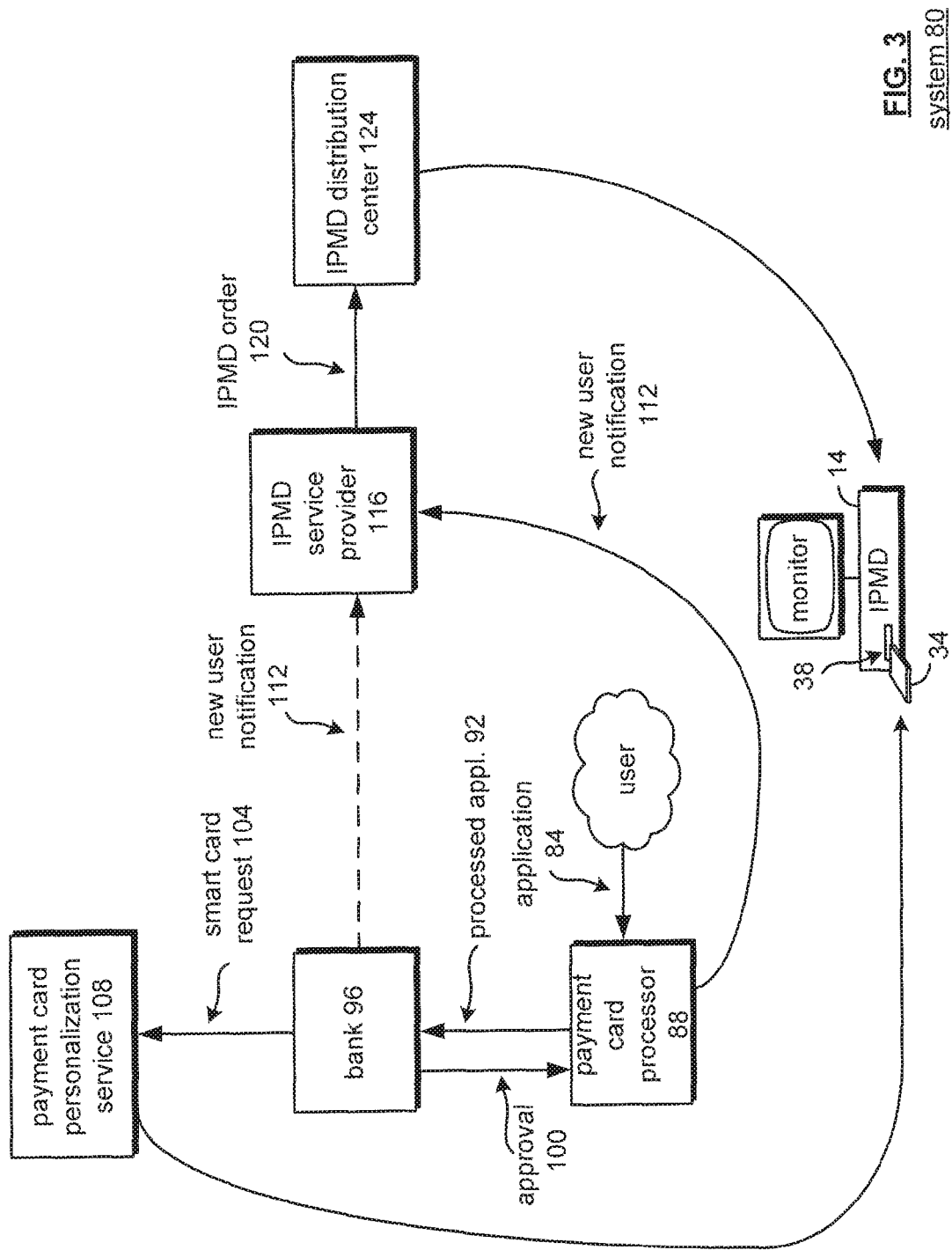
FIG. 3 is a functional block diagram of a system for establishing an established association between a media device and a payment account according to one embodiment of the invention.

FIG. 3 is a functional block diagram of a system 80 that illustrates a process for creating an established association between an authorized media device and a payment account according to one embodiment of the invention. The figures and corresponding text are directed to a media device that is capable of receiving data and communicating over at least one of a plurality of network types. In one specific embodiment, media device 14 (as described here in FIG. 3) is an IP media device (IPMD). Alternatively, the media device may be an IP television (IPTV) set top box. Additionally, in the described embodiment of FIG. 3, the payment account is associated with a smart card 34 produced in the form of a smart card. Generally, a process of system 80 supported according to an embodiment of the present invention is one that establishes an association between a user payment account and an authorized media device, such as media device 14. After such association is made, an IPMD wherein purchase selection messages may only be made for the specified user account by the authorized media device 14.

The process begins with a user generating an application 84 for a new payment account and producing the application 84 to a payment card processor 88. Payment card processor 88 is, for example, a credit card company that processes credit cards for issuer companies such as banks and other financial institutions or for the bank itself. In general, references herein to "payment card processor" are references to payment card processing entities or companies. The user may utilize a web based interactive program or may physically deliver a paper application to the payment card processor 88, which then produces processed application 92 in an electronic form to bank 96 for processing. Processed application 92 is based on application 84.

While the example of FIG. 3 illustrates the user providing the application directly to payment card processor 88, it should be understood that the user may also deliver the application to any other entity that subsequently provides the application to the payment card processor 88 including bank 96 and an IPMD service provider. Accordingly, payment card processor 88 generates a processed application 92 to bank 96. Bank 96 then approves or denies processed application 92.

Upon approving processed application 92, bank 96 generates an approval 100 to payment card processor 88. Bank 96 also generates a smart card request 104 to payment card personalization service 108. Upon receiving approval 100, payment card processor 88 generates a new user notification 112 to IPMD service provider 116. In an alternate approach, bank 96 generates and transmits new user notification 112 to IPMD service provider 116 after bank 96 approves processed application 92. IPMD service provider 116 then transmits an IPMD order 120 to IPMD distribution center 124. IPMD distribution center 124 then ships an IPMD to the user. Finally, during this process, payment card personalization service 108 ships smart card 34 for insertion into port 38 of IPMD 14. In the embodiment in which the IPMD comprises an IPTV set top box, for example, IPMD distribution center 124 sends the IPTV set top box to the user.

In one embodiment of the invention, smart card 34 includes a serial number or other identification number of media device 14. This serial number is a non-modifiable number and is hardware based. Accordingly, subsequent purchase orders can only be approved if the ID number stored on the smart card and the ID of the media device match when a purchase selection is made by an authorized media device in one embodiment of the invention. The process includes media server service provider 116 producing the hardware ID number to either bank 96 or payment card processor 88 for delivery to payment card personalization service 108. In general, the ID of the authorized media device must match the ID of a media device that generates a purchase selection message for an account having an established association with the media device before a purchase approval can be generated.

Figure 1:
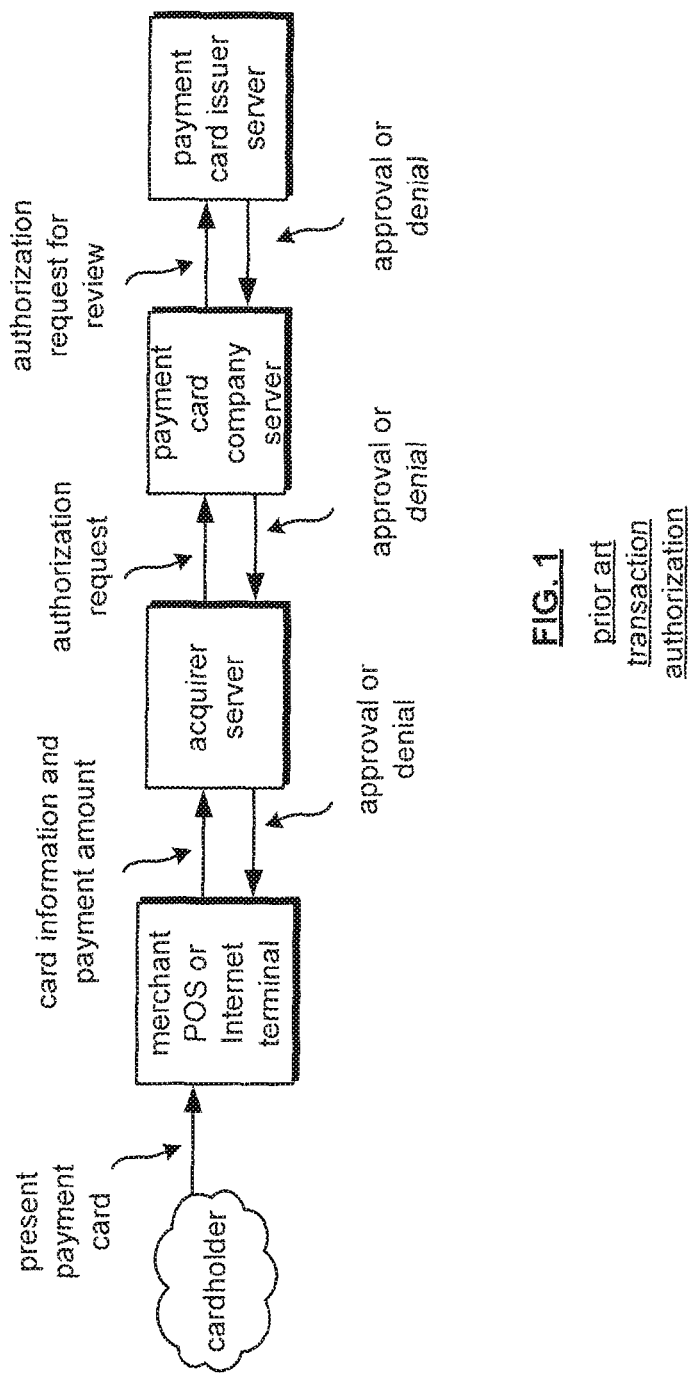
FIG. 1 is a functional diagram that illustrates a payment card authorization process that can support a typical e-commerce transaction according to the prior art.

Payment card personalization service 108 is, in one embodiment, an element of a network operable to generate personalized smart cards that include account information as well as encryption keys and other information to support the creation of secure smart cards. For example, U.S. Pat. No. 6,367,011 to Lee et al. provides details of one smart card personalization system which, as shown in FIG. 1 of Lee et al., includes elements at the issuer location as well as elements at a "personalization location."

The methods and apparatus of the embodiments of the invention are applicable to Internet based media devices that operably couple to an associated media server from which media content or associated products or services may be purchased over a public network. For example, the concepts herein are applicable to game systems such as the Sony Wii™, Gamecube™, and XBox™ and other similar systems. Generally, though, media content and advertisements for products and services are produced to a display device to allow a user to make purchases associated with the media content and advertisements merely by pressing the so called "buy it now" button on a remote control, a dedicated button on the system, or a so called "soft button" of a graphic display. A display for displaying media with advertising may comprise any known display device including television sets, traditional monitors, LCD displays, or projectors. These displays may be separate or integrated into the media device. For example, the display may be an LCD screen of an audio player such as an MP3 player. Many such systems include an ability to communicate over an IP network though the ability to communicate over an IP network is not required. Generally, the embodiments include any system that is operable to deliver media to the user device and to receive a purchase indication from the user device through the same or a different network while a purchase transaction is pending.

Figure 4:
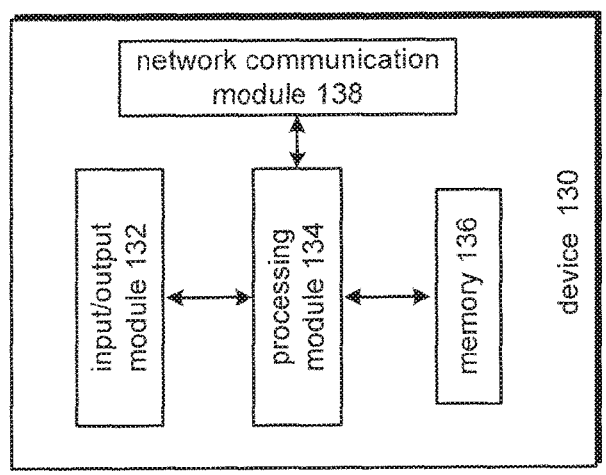
FIG. 4 is a functional block diagram of a device 130 that is operable operations and functionality as described in relation to the various aspects of the embodiments of the invention.

FIG. 4 is a functional block diagram of a device 130 that is operable to perform the operations and functionality as described in relation to the various aspects of the embodiments of the invention. For example, device 130 may be used to receive and process an application for a payment account that is to be associated with media device 14 according to one embodiment of the invention. While device 130 is described as a device for processing an application for a payment account, the structure and functionality of device 130 may be applied to each computer device or server described here in this specification in relation to prior and subsequent figures. Device 130 includes an input/output module 132 operable to receive user inputs from a keyboard, mouse and other user input devices and further to generate display signals and/or audio signals for display on a display device and for playing sound through a speaker system, respectively, to create a user interface with device 130. As such, device 130 is operable to receive an application directly from a user in addition to receiving the application over the Internet. A processing module 134 is operable to communicate with input/output module 132 and to process incoming signals based upon user input and upon signals received over the Internet. Memory 130 is operable to store computer instructions and data.

The processing module 134 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information.

Note that when the processing module 134 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-3 and in the Figures that follow FIG. 4.

Continuing to refer to FIG. 4, processing module 134 of device 130 is operable to retrieve computer instructions from memory 136 which instructions define operational logic of device 130 including logic for performing the method steps of at least one embodiment of the invention described herein this specification. For example, the logic defined by the computer instructions support application processing for payment accounts that will be associated with a media device. Finally, processing module 134 is operable to engage in wireless and wired communications through various data packet networks and wireless communication networks via network communication module 138 to support the various method steps described herein.

More specifically, processing module 134 is operable to communicate with the input/output module 132, network communication module 138, and memory 136 to execute the computer instructions stored within memory 136. Based upon at least one of the stored data in memory 136, the received data from network communication module 138, and the user data entry received from input/output module 132, processing module 134 is operable to receive and process an application for a media device associated payment account, transmit an approved application indication, and support or establish an established association between the payment account and media device 14.

Figure 5:
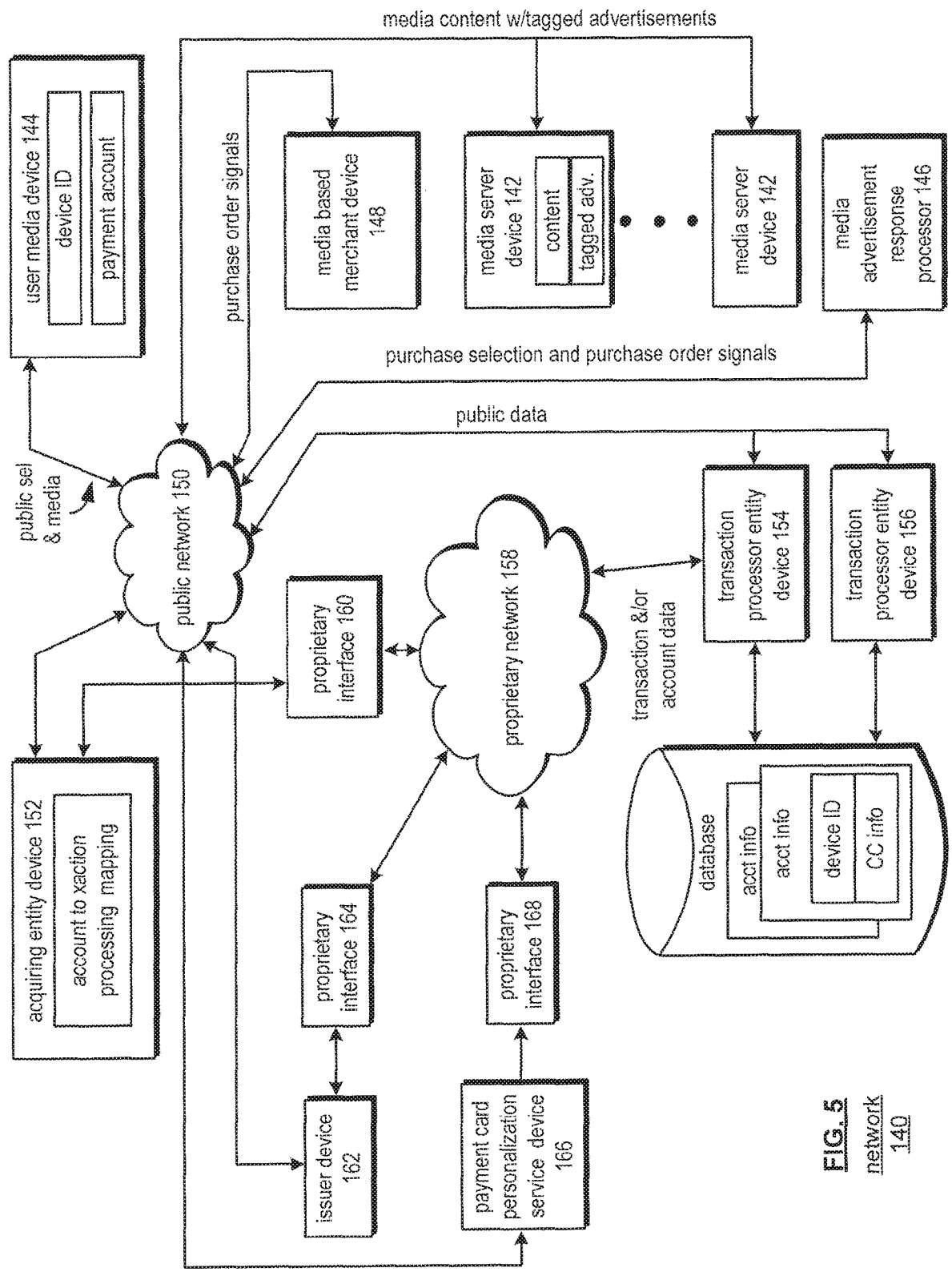
FIG. 5 is a functional block diagram of a network operable for establishing and supporting electronic transactions according to one embodiment of the invention.

FIG. 5 is a functional block diagram of a network operable for establishing and supporting electronic transactions according to one embodiment of the invention. Network 140 generally comprises financial network devices that interact with media service provider devices, merchant devices and user media devices having an ability to establish and subsequently support a purchase selection. More specifically, the network elements or devices of network 140 are operable to initially support creation of personalized payment cards and to subsequently support electronic transactions using the payment cards. In at least one embodiment, the payment cards are smart cards have a form factor similar to subscriber identity module (SIM) cards in that they may be received by SIM card reader to communicate with a computer or other device that has a port or interface to communicate through a SIM card reader with the smart card. In one particular embodiment, through not required, the smart card is formed as an actual SIM card.

Here, the payment card, with associated payment account track 1-3 type data, as well as other information, may be encrypted and protected by the smart card. In one embodiment, the data is partially encrypted to allow access to certain types of data while protecting other types of information. Examples of payment data which may be fully protected, partially protected or not protected all according to implementation include payment account number, expiration date, usage limits including purchase amounts or totals, a permanent ID of an authorized device that has an established association with the payment account, issuer ID, payment account processor ID, and personal identification number. One aspect of network 140 is that network 140 is operable to support an application and account creation process that results in a payment account having an established association with a specified user media device from which a user may initiate purchase transactions using the payment account.

Network 140 includes a media server device 142, a user media device 144, a media advertisement response processor 146, and a media based merchant device 148 that are all coupled to communicate through one or more public networks 150. Media server device 142 is operable to provide media content and tagged advertisements to user media device 144.

Media server device 142 can be, for example, a device that delivers media by way of wireless communication channels and/or wired networks. The wireless networks can comprise the wireless cellular networks, satellite based wireless networks, or even public wireless local area networks and wireless wide area networks. The wired networks can be any known technology including cable networks for delivering so called broadcast television programming content, the public switched telephone networks, or computer and data networks such as Internet Protocol networks. According to implementation, these various types of networks can be used either for delivery of media content, delivery of communication messages that support an electronic transaction, or both. For example, one type of network may be used for delivering the media content while another is used to conduct purchase related communications. Alternatively, one type of network may be used for both.

Continuing to refer to FIG. 5, network 140 includes an acquiring entity device 152 of a payment card acquirer company that is operable to communicate with media based merchant device 148 over public network 150 as well as with a payment account processor entity device 154 or 156 of a payment account processor company by way of a proprietary network 158. Acquiring entity device 152 includes a mapping of user payment accounts with transaction processing entities such credit card processing companies.

A proprietary interface 160 is utilized to enable acquiring entity device 152 to communicate through proprietary network 158. An issuer device 162 also is coupled to communicate through both the public network 150 and through proprietary network 158 by way of interface 164. Similarly, a payment card personalization service device 166 is coupled to communicate through both the public network 150 and through proprietary network 158 by way of interface 168. Finally, as shown, each transaction processor entity device 154 is operable to communicate with one or more databases that include payment account information and a permanent ID of a module or media device from which authorized purchase transactions may be initiated.

In operation, media server device 142 is operable to produce media with a tag number for identifying items or services that may be purchased by a user. Accordingly, user media device 144 is operable to receive and play the media content for advertisements or advertised items. Media device 144 is also operable to produce purchase selection indications to media server device 142 with the advertisement tag number to identify the advertisement that corresponds to the purchase selection indications. In an alternate embodiment, the purchase selection indications are produced to media advertisement response processor 146. Here, a first type of public network delivers media to user media device 144 and a second type of network delivers user media device responses to media server device 142 or to media advertisement response processor 146. A public network 150 is used for delivery of the media content though a private network may be used instead.

Once either device 142 or 146 receives a purchase selection indication, device 142 or 146 is operable to forward the purchase selection indication to merchant device 148 over public network 150. Merchant device 148 is then operable to generate and provide a purchase authorization request to acquiring entity device 152. Acquiring entity device 152 then forwards the purchase authorization request to a transaction processor entity device 154 by way of proprietary network 158. The transaction processing entity device then performs several authorization processing steps including evaluating account standing and verifying that all authorization associated data appears to be proper according to implemented guidelines. Transaction processor entity device 154 then forwards the authorization request to a payment account issuer device 162. Payment account issuer device then makes a final authorization decision to approve or deny the authorization request.

User media device 144 is operable to provide payment account information and an ID of user media device 144 along with the purchase selection indication. Accordingly, at least one of the media server device 142, the media advertisement response processor 146, the acquiring entity device 152 and the issuer device 162 is operable to compare the user media device ID to the payment account information as a part of determining whether to approve (or forward) the authorization request.

Media server device 142 is operably disposed to communicate through public network 150 with merchant device 148 that is identified by the tag number of an advertisement. Merchant device 148 is further coupled to communicate over public network 150 with acquiring entity device 152 to initiate transaction approval and settlement processing. Generally, acquiring entity device 152 is operable to receive the authorization request for a purchase transaction and to communicate with at least one device in a financial network through a proprietary interface and/or network to request and receive a purchase authorization approval.

An additional aspect of the operation of network 140 is that any of devices 142, 148, 154 and 162 is operable to provide account application information including at least a portion of an account number directly or indirectly to payment card personalization service device 166. Payment card personalization service device 166 is operable to receive the permanent ID of user media device 144 to embed the permanent ID within the data stored within the payment card. For example, the ID may be stored in an encrypted form in a smart card along with other account information to create an established association between the account and the user media device 144.

In an alternate embodiment, an established association between the account and the user media device may be created through an initial communication. Here, devices 154 and 162 are operable to establish a common encryption key with one of user media device 144 or smart card 34 installed within user media device 144 to generate an encryption key for protecting data in purchase transactions initiated by the (authorized) user media device. This encryption key is then used to protect at least a portion of the account information. Accordingly, the encrypted portion of the account information will only be properly decrypted if an authorized ID is provided as a part of a purchase selection since the provided ID will be used to select an encryption key for a received authorization request. In general, a user media device ID is transmitted as a part of or in association with a purchase selection and, if the ID is one that has an established association with the payment account identified in the transaction and/or account data, then the transaction may be approved or forwarded to a different device for approval.

Figure 6:
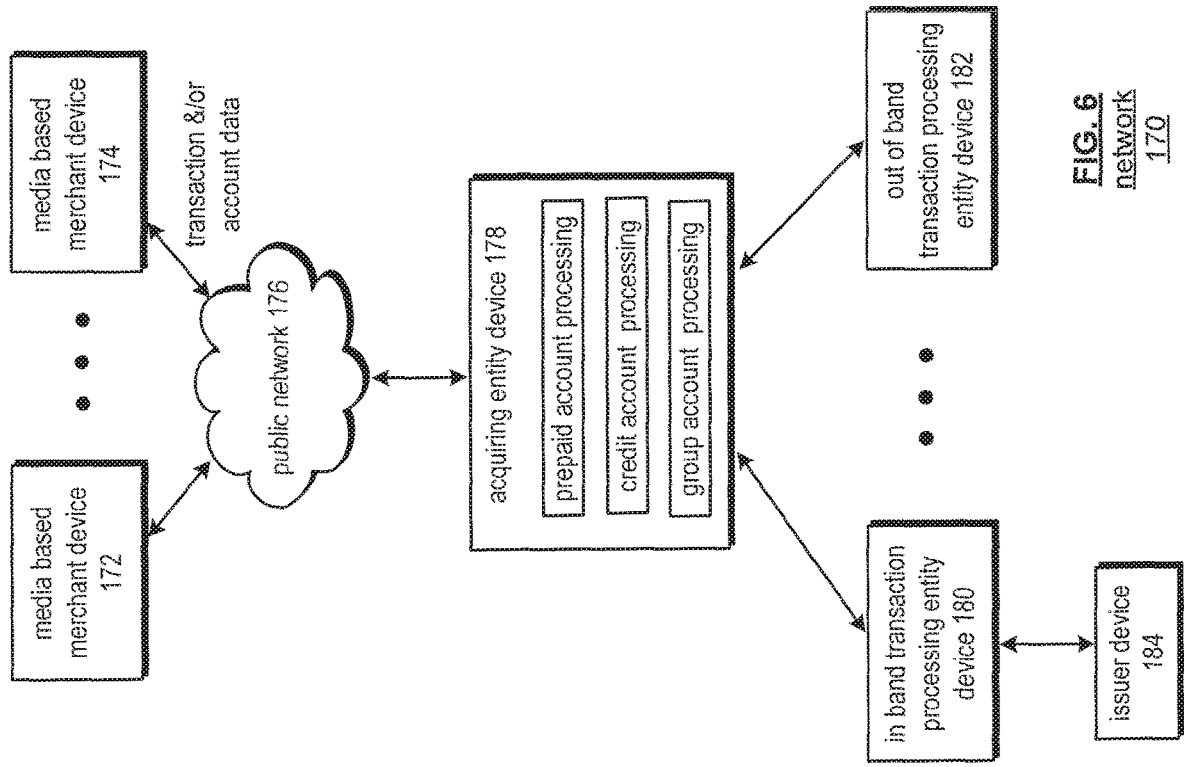
FIG. 6 is a functional block diagram of a computer network operable to support payment authorization processing according to one embodiment of the invention.

FIG. 6 is a functional block diagram of a computer network 170 operable to support payment authorization processing according to one embodiment of the invention. A plurality of media based merchant devices 172-174 are each operable to generate and provide transaction and/or account data and to transmit such data through a public network 176 to an acquiring entity device 178. Acquiring entity device 178 is then operable to provide the transaction and/or account data to an in-band processing entity device 180 or to an out of band transaction processing entity device 182. Here, in-band processing entity device 180 is further operable to provide the transaction and/or account data to an issuer device 184.

The transaction and/or account data is transmitted as a part of an authorization request for approval of a pending purchase selection. The transaction and/or account data includes an ID of a user media device that generated the purchase selection request. The acquiring entity device 178 comprises a plurality of processing modules including, in the described embodiment, a prepaid account processing module, a credit account processing module, and a group account processing module.

Based upon the transaction and/or account data, a corresponding module of the modules of device 178 process the transaction and/or account data to determine which processing entity device should receive the transaction and/or account data. For example, for a credit account or group account, an in-band processing entity such as entity 180 may be the device to which the transaction and/or account data should be transmitted. Similarly, for a prepaid account, the prepaid account processing module may determine that an out-of-band transaction processing entity such as entity 182 should receive the transaction and/or account data. Generally, FIG. 6 illustrates that a single acquiring entity device may interact with a plurality of merchant devices 172-174 as well as a plurality of processing entity devices 180-182.

Any one of acquiring entity device 178, in-band transaction processing entity device 180, out-of-band transaction processing entity device 182, or issuer device 184 is operable to determine if the permanent ID of the media device that transmitted the purchase selection indication is one that corresponds to and is authorized to initiate purchase selections for the payment account identified by the payment account information. Such a determination may be made based upon an established association between the payment account and the device ID in a plurality of described approaches.

Figure 7:
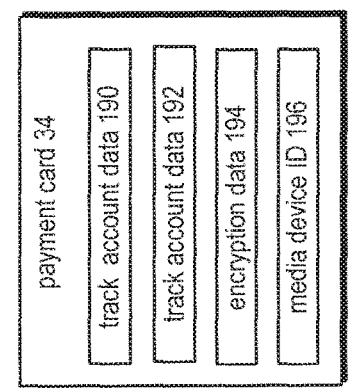
FIG. 7 is a functional block diagram of a payment account according to one embodiment of the invention.

FIG. 7 is a functional block diagram of a payment card according to one embodiment of the invention. Payment card 34 is a smart card and includes a plurality of magnetic stripe equivalent (MSD) data blocks including track account data blocks 190-192, an encryption data block 194 and a media device ID data block 196. Any or all of the MSD data blocks 190-196 may be encrypted or may include encrypted data. The "track account" data (i.e., magnetic stripe equivalent data) of blocks 190-192 is merely the type of data that has historically gone into so called track 1, track 2, or track 3 of a magnetic strip of a payment card. Here, two track account data blocks are provided in which one includes encrypted data and one includes unencrypted data though the payment card may including additional account data blocks. Encryption data block 194 includes an encryption key for encrypting data and/or for encrypted communications between the smart card (payment card 34) and another device such as a processing entity device 180 or issuer device 184. In one embodiment, a smart card personalization service creates a unique derived key from a master key that is stored within encryption data block 194. If the master key is altered in a subsequent process, the new unique derived key is stored within encryption data block 194. Media device ID block 196 includes a media device ID that was received by the smart card personalization service for associating with a payment account. In one embodiment of the invention, the unique derived key is derived using the media device ID 196 as derivation data.

Figure 8:
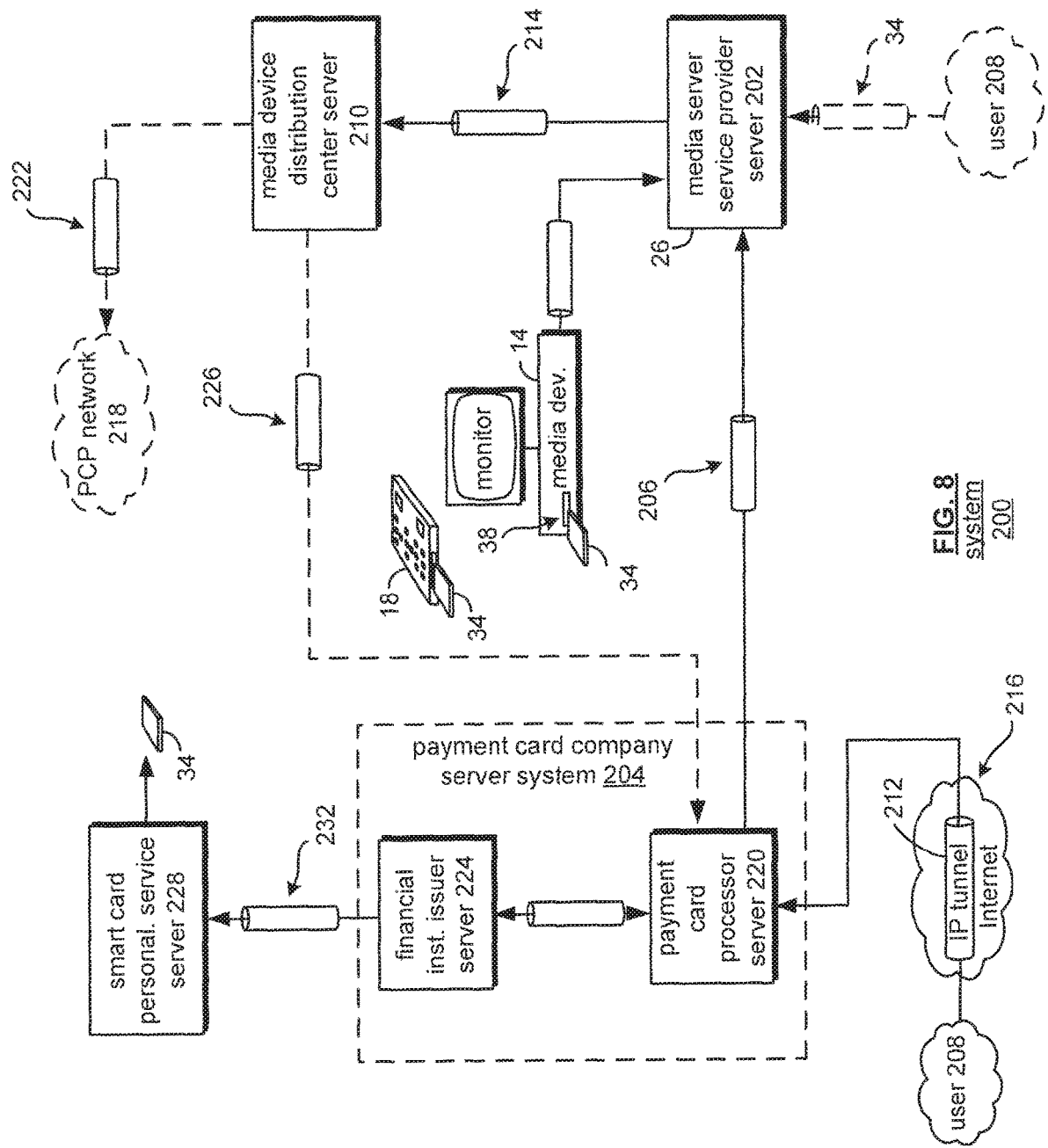
FIG. 8 is a functional block diagram of a computer system that illustrates a process for creating an established association between a payment account and a media device according to one embodiment of the invention.

FIG. 8 is a functional block diagram of a computer system 200 that performs an exemplary process for creating an established association between a payment account and a media device according to one embodiment of the invention. Referring now to FIG. 8, payment card company server system 204 is operable to communicate with a user 208 to receive a payment account application that is to be associated with media device 14. For exemplary purposes, user 208 is coupled to and communicates with payment card processor server 220 through a secure IP tunnel 212 over a data packet network such as the Internet 216. Alternatively, user 208 may enter such application using a keyboard, mouse, and display coupled to payment card processor server 220 or to financial institution issuer server 224.

Secure IP tunnel 212 is an encrypted communication that is transmitted through wired and/or wireless communication paths within one or more data packet networks such as the Internet. Any known technology for securing data packet transmissions through wired and wireless communication links may be included. Hereinafter, all references to secure IP tunnels and/or secure communication channels should be understood to refer to encrypted and protected communication through at least one of a wired or wireless network and may include encrypted transmissions through known data packet networks such as Internet 216. Moreover, in the embodiments that follow, it should be understood that at least a portion of the payment account related data is encrypted whether or not shown or described in relation to the figures in addition to encryption of communications between devices.

Payment card company server system 204 includes at least one of a payment card processor server 220 and a financial institution issuer server 224. Generally, the various embodiments of network 200 and, more specifically, payment card company server system 204 may include a single payment card processor server 220, a single financial institution issuer server 224, or both. In an embodiment that comprises both, payment card processor server 220 communicates with financial institution issuer server 224 over a secure IP tunnel.

In system in which payment card company server system 204 includes only one server 220 or 224, either server 220 or 224 performs the same basic tasks of receiving and approving applications and supporting the creation of a smart card based payment account that is to have an established association with a media device 14. Thus, it may be seen that either a payment card processor company, for example, Visa, Inc., or a financial institution, may perform all of payment account application processing that has historically been performed jointly by both institutions. Accordingly, in the various embodiments of the invention, a system 200 may comprise one processor server 220, one issuer server 224, or both to support the creation of a payment account that is to have an established association with a media device 14 as an authorized media device. Payment card processing server system 204 therefore reflects any of these embodiments. Generally, supporting the creation of a smart card based payment account includes any of the steps or transmission of any of the messages described herein for system 204 or for servers 220-224.

Payment card processing server system 204 is therefore operable to generate an approved indication to a smart card personalization service server 228 over a secure IP tunnel 232 after the application has been approved. Each smart card personalization server such as smart card personalization server 228 is similar to payment card personalization service 108 of FIG. 3 in that server 228 may represent but one element of a system that supports smart card creation and personalization. The approved indication includes payment account information that is to be embedded within a smart card 34 generated by smart card personalization service server 228.

Payment card processing server system 204 is also operable to transmit a media device new user account indication to a media device service provider server 202 over a secure IP tunnel 206 through a data packet network or other public network such as the Internet. Media server service provider server 202 is then operable to transmit an order to media server distribution center server 210 over secure IP tunnel 214. In response, media server distribution center server 210 prompts the mailing or delivery of a media device to user 208. Additionally, in one embodiment, media server distribution center server 210 is operable to produce the media device identifying number for the media device being sent to user 208 to one of payment card processing network 218 over secure IP tunnel 222 or to payment card company server system 204 by way of secure IP tunnel 226. This identifying number is transmitted to support subsequent payment authorization and settlement processes that evaluate a media device user payment account in relation to the media device identifying number and, more generally, to support the creation of an established association between media device 14 and the payment account for user 208.

If the media device identifying number is produced to payment card processing server system 204 by server 210 and not to PCP network 218, in an alternate embodiment, then payment card processing system server system 204 is operable to distribute the media device identifying number to PCP network 218 as necessary to support payment authorization and settlement processes. For example, payment card processing system server 204 is operable to transmit the media device identifying number and at least a portion of the associated media device payment account information to at least one of a transaction authorization network server to support the authorization of transactions based in part upon the media device identifying number and/or to a settlement processing network server to support the settlement of transactions based in part upon the media device identifying number.

Figure 9:
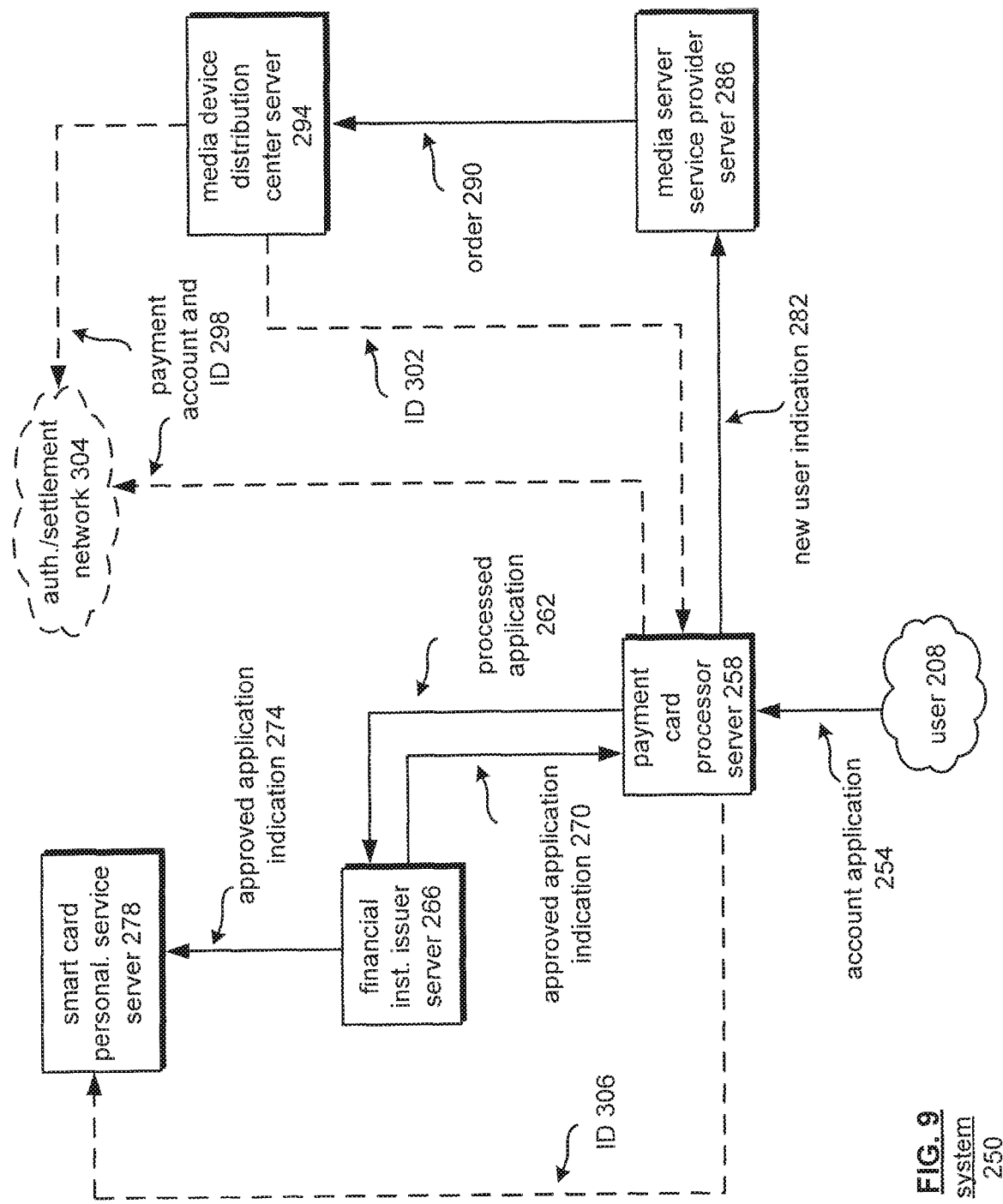
FIG. 9 is a functional block diagram of a computer system that includes a payment card company server and a financial institution issuer server that jointly support creating an established association between a payment account and a media device according to one embodiment of the invention.

FIG. 9 is a functional block diagram of a computer system 250 that includes a payment card processor server 258 and a financial institution issuer server 266 that jointly support creating an established association between a payment account and a media device according to one embodiment of the invention. A user 208 provides a media device payment account application 254 to payment card processor server 258 for a payment account for use in association with a media device such as media device 14 of the prior figures. The application may be provided through manual entry or in an electronic form, through a computer network or Internet connection as described in relation to FIGS. 3-5 and 7-8. Payment card processor server 258 then generates message 262 which includes processed media device payment account application to financial institution server 256.

Processed media device payment account application 262 is based upon the media device payment account application 254 and may include additional information such as an application reference number or other application identifying information. The information is provided in a defined format to enable financial institution issuer server 266 to receive and further process the application. A flexible extended markup language type protocol may be used, for example, for the defined format.

Financial institution issuer server 266 then generates message 270 which includes an approved media device payment account application indication to payment card processor server 258. This indication in message 270 may be based upon a user input. For example, a credit or loan officer of the financial institution may approve the application and enter such approval to allow financial institution issuer server 266 to transmit message 270. Alternatively, logic executed by financial institution issuer server 266 allows, at least in some conditions, for approval of the media device payment account processed application of message 262.

The approved media device payment account application indication in message 270 specifically includes the application reference number or identification information. Additionally, financial institution sever 266 also generates message 274 which includes the approved media device payment account application indication to smart card personalization service server 278 to facilitate creation of a smart card based user smart card payment account. The approved media device payment account application indication of message 274 includes a user 208 mailing address as well as additional user 208 payment account information to allow smart card personalization service server 278 to prompt a mailing of a generated smart card with the user 208 payment account information to user 208.

Payment card processor server 258 generates message 282 which includes a media device payment account new user indication to media server service provider server 286. Media server service provider server 286 then generates media device order in a message 290 to media device distribution center server 294. Media device distribution center server 294, in response to receiving message 290, initiates a delivery or mailing of a media device 14 to user 208. Additionally, in one embodiment, media device distribution center server 294 then produces message 298 which includes media device payment account information and the media device ID to authorization and settlement network elements or devices of authorization and settlement network 304. The authorization and settlement network 304 is similar to and may include one or more of the financial network elements or devices of FIG. 5 to support, as necessary, the established association between payment accounts and media devices. Media device distribution center server 294 is also operable to provide the media device ID in message 302 to payment card processor server 258 to allow payment card processor server 258 to take one or more subsequent steps to create the established association between the media device based on the media device ID received in message 302 with the user 208 payment account.

Payment card processor server 258, for example, may subsequently transmit message 298, in an embodiment in which server 294 does not generate message 298, to authorization and settlement network elements of authorization and settlement network 304. Additionally, payment card processor server 258 is operable to produce the media device ID in a message 306 to smart card personalization service server 278 to enable smart card personalization service server 278 to include the media device ID of message 306 within the user 208 payment account information to support creating the established association between the payment account and media device 14. Message 306 may include additional information to enable smart card personalization service server 278 to associate the media device ID to the correct payment account. An encryption key may also be provided by server 278 for storing in smart card 34. Additionally, in one embodiment, the payment account information is provided to server 278 in an encrypted form for storing in smart card 34.

Figure 10:
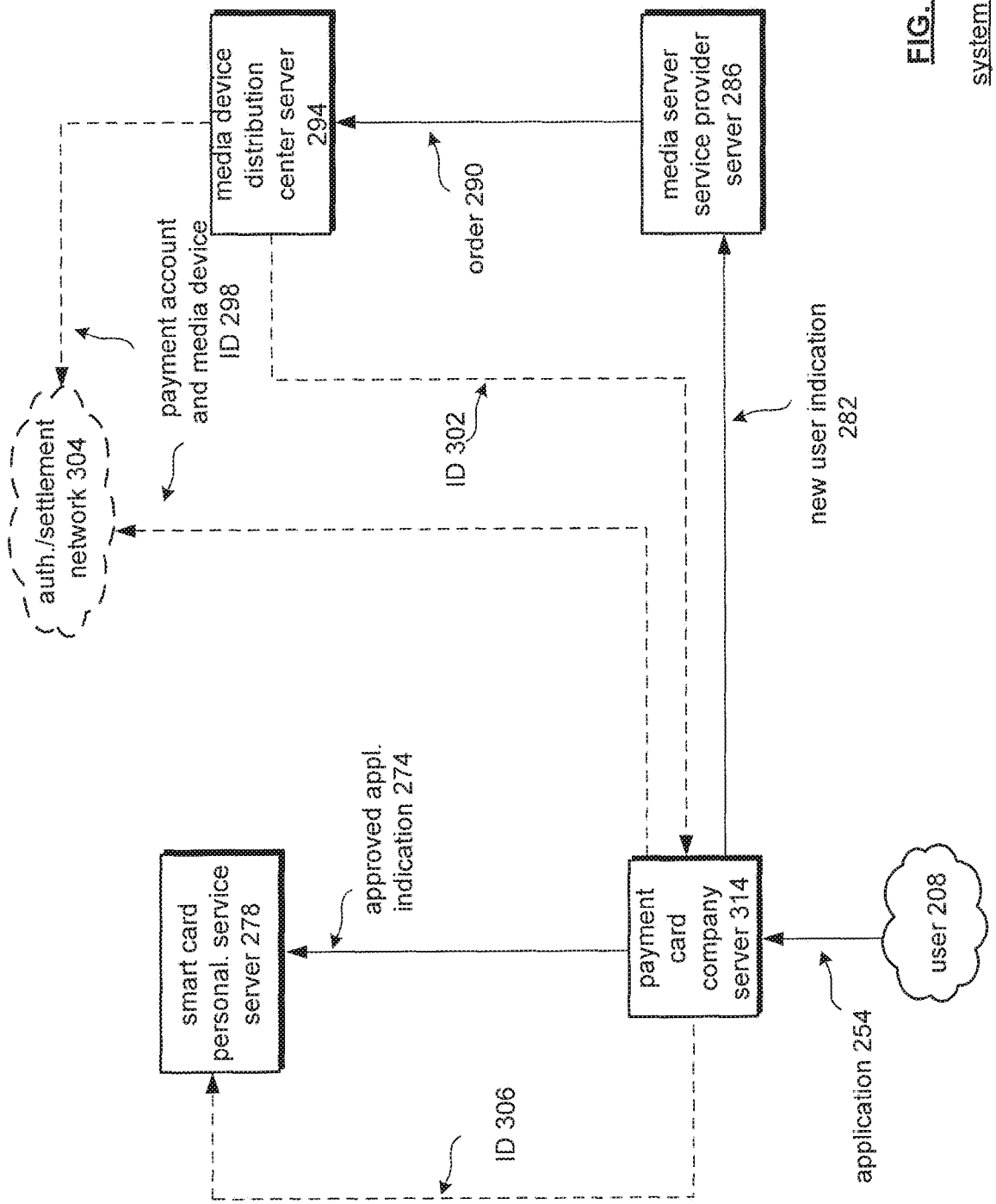
FIG. 10 is a functional block diagram of a computer system that includes a payment card company server operable to support creating an established association between a payment account and a media device according to one embodiment of the invention.

FIG. 10 is a functional block diagram of a computer system 310 that includes a payment card company server 314 operable to support creating an established association between a payment account and a media device according to one embodiment of the invention. In general, references herein to "payment Card Company" are intended to relate to companies that serve in the role of a payment card processing company such as a credit card processing company, or to a payment card issuer such as a bank or other financial institution, or to a combination of an issuer and a processing company. Accordingly, a payment card company server such as server 314 is one that is capable of performing functionality of any issuer server and/or any payment card processor server and represents one or more servers.

Returning to FIG. 10, a user 208 provides a media device payment account application 254 to payment card company server 314 for a payment account for use in association with a media device such as media device 14. Payment card company server 314 is operable to support approval of the media device payment account application and then to generate message 274. Message 274 includes an approved application indication and is transmitted to smart card personalization service server 278 to facilitate creation of a smart card that includes payment account information.

The approved application indication of message 274 includes a user 208 mailing address as well as additional user 208 payment account information. This allows smart card personalization service server 278 to prompt a mailing of a generated smart card with the user 208 payment account information to user 208. This indication of message 274 may be based upon a user input wherein, for example, an approval of the application by a credit or loan officer of the financial institution. Alternatively, the indication of message 274 may be based upon logic executed by a payment card company server that allows, at least in some conditions, for approval of an application based upon the data provided within a media device payment account application.

Payment card company server 314 also generates message 282 which includes a media device payment account new user indication to media server service provider server 286. Media server service provider server 286 then generates media device order in message 290 to media device distribution center server 294. Media device distribution center server 294 then initiates a delivery or mailing of a media device 14 to user 208. Additionally, in one embodiment, media device distribution center server 294 then produces media device payment account information and a media device ID in message 298 to authorization and settlement network elements of authorization and settlement network 304. Media device distribution center server 294 is also operable to optionally provide the media device ID in message 302 to payment card company server 314. Payment card company server 314 is operable to then take one or more subsequent steps to create an established association between the media device and the user 208 payment account.

Payment card company server 314, for example, may subsequently transmit payment account information and the media device ID in message 298 to authorization and settlement network elements of authorization and settlement network 304 in place of server 294 sending message 298. Additionally, payment card company server 314 may produce the media device ID in message 306 to smart card personalization service 278. This enables smart card personalization service server 278 to include the media device ID received in message 306 within the user 208 payment account information to support approval and settlement processes that are based upon both user account information and an ID of a media device server 14. Message 306 includes the media device ID in message 302 and may also include additional information to enable smart card personalization service server 278 to associate the media device ID to the correct payment account.

The operation performed in relation to FIG. 10 and its description herein may be modified, for example, by substituting payment card company server 314 with a financial institution issuer server 266, for example, wherein financial institution issuer server 266 performs all of the steps and message transmissions described for payment card company server 314. Here, the financial institution server operates as payment card company server 314. Accordingly, for such an embodiment, any reference to payment card company server 314 includes financial institution issuer server 266.

In current processes, the roles of the payment card processor company and financial institution are distinct and thus a process as illustrated in relation to FIG. 9 may be implemented. If payment card processor companies and financial institutions expand their roles to overlap with tasks traditionally performed by the other, then an embodiment of the invention similar to that described here in FIG. 10 could be realized. The payment card company server may be a part of a network or system of any entity that enters the space of issuing payment cards as well as the credit or monetary balances to facilitate the settlement process for approved purchases.

Figure 11:
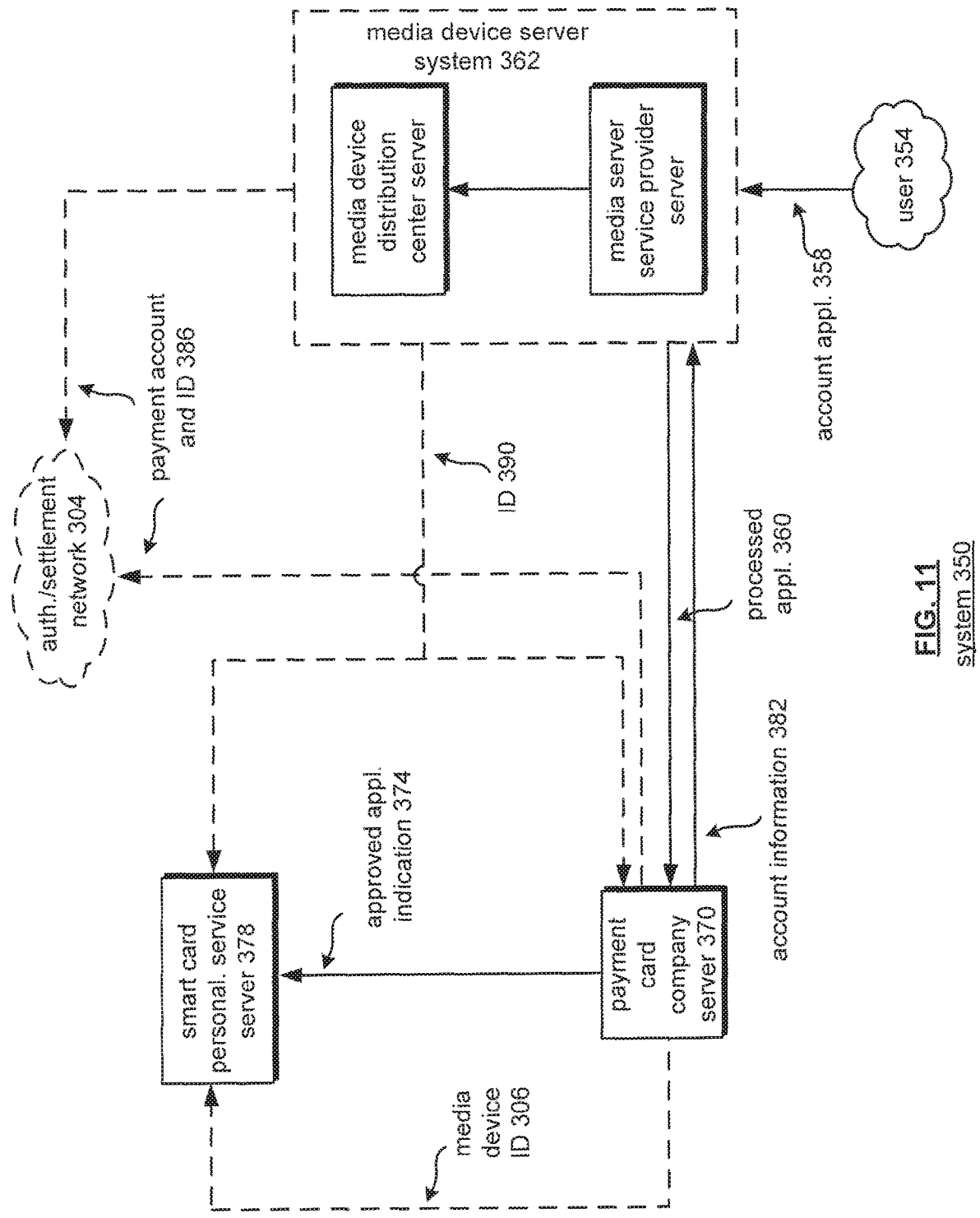
FIG. 11 is a functional block diagram of a computer network that includes a payment card company server operable to support creating an established association between a payment account and a media device according to one embodiment of the invention.

FIG. 11 is a functional block diagram of a computer system 350 that includes a payment card company server operable to support creating an established association between a payment account and a media device according to one embodiment of the invention. A user 354 provides a media device payment account application 358 to media device server system 362 for a payment account for use in association with a media device such as media device 14. As may be seen, media device server system 362 may include both a media server and a media device distribution center server. The functionality of these two servers may readily be rearranged or distributed across a different number of servers or may even be combined into one server. Each such embodiment is represented by media device server system 362. Each of the described embodiments may be similarly modified.

Media device server system 362 is operable to generate a media device payment account processed application 360 in an electronic form to payment card company server 370. As before, payment card company server 370 is a server that is in operable, among other tasks, to initiate a payment card and account generation process. Moreover, payment card company server 370 can comprise any of the embodiments of payment card company server system 204 of FIG. 8. Stated differently, server 370 may comprise a single module similar to server 314 of FIG. 10 or a plurality of modules similar to servers 258 and 266 of FIG. 9.

Payment card company server 370 is then operable to generate message 374 which includes a media device approved application indication to smart card personalization service server 378 to facilitate creation of a smart card for a payment account. The media device payment account approved application indication of message 374 includes a user 354 mailing address as well as additional user 354 payment account information Payment card company server 370 generates message 382 which includes media device payment account information to media device server system 362. The media device payment account information of message 382 may comprise an indication that the account is approved. Message 382 comprises at least some of the payment account information to allow media device server system 362 to perform an initial authorization for a user selected charge using the "pay it now" feature described previously. Generally, references to transmitting payment account information include transmitting any portion of the payment account information including all of the payment account information that is stored within or received by a device.

Additionally, in one embodiment, media device server system 362 then produces message 386 which includes media device payment account and the media device ID to authorization and settlement network elements of authorization and settlement network 304. Media device server system 362 is also operable to provide message 390 which includes the media device ID to payment card company server 370 to allow payment card company server 370 to take one or more subsequent steps to create the established association between the media device ID 390 (and therefore the associated media device) and the user 354 payment account. In one embodiment, media device server system 362 is further operable to provide message 390 which includes the media device ID directly to smart card personalization server 378 to enable the generation of smart cards having not only payment account information, but also the media device ID.

Figure 12:
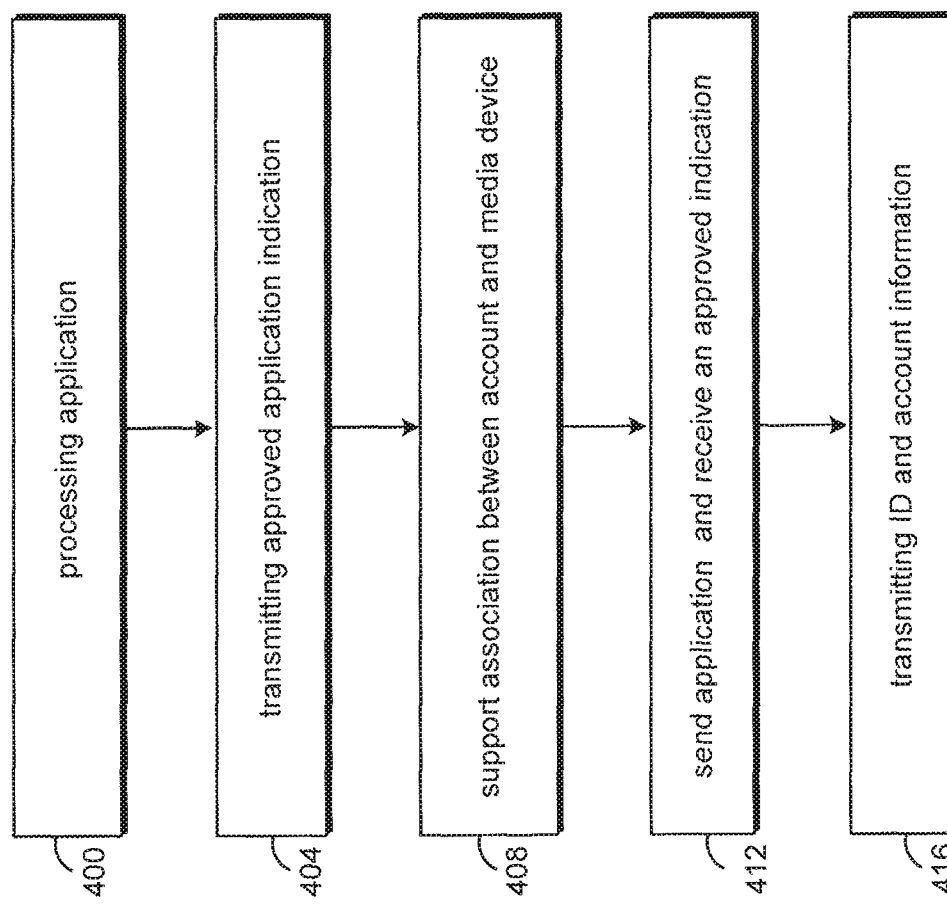
FIG. 12 is a flow chart that illustrates method steps for a payment account according to a plurality of embodiment of the invention.

FIG. 12 is a flow chart that illustrates a method for a payment account according to one embodiment of the invention. The method initially includes receiving and processing an application for a media device associated payment account (step 400). Thereafter, the method includes transmitting an approved application indication to a remote server to initiate a payment card generation process (step 404). Additionally, the method also includes taking one or more steps supporting an established association between the payment account and the media device (step 408). Such steps include storing and/or transmitting payment account information in relation to the authorized media device ID.

The method also includes, in one embodiment, receiving the application and generating the processed application to a financial institution server and subsequently receiving an approved indication from the financial institution server (step 412). Finally, the method includes determining and transmitting a media device identification number (ID) and at least a portion of the media device associated payment account information to at least one device or element of a transaction authorization and settlement network to support the authorization of transactions based in part upon the media device ID (step 416).

Figure 13:
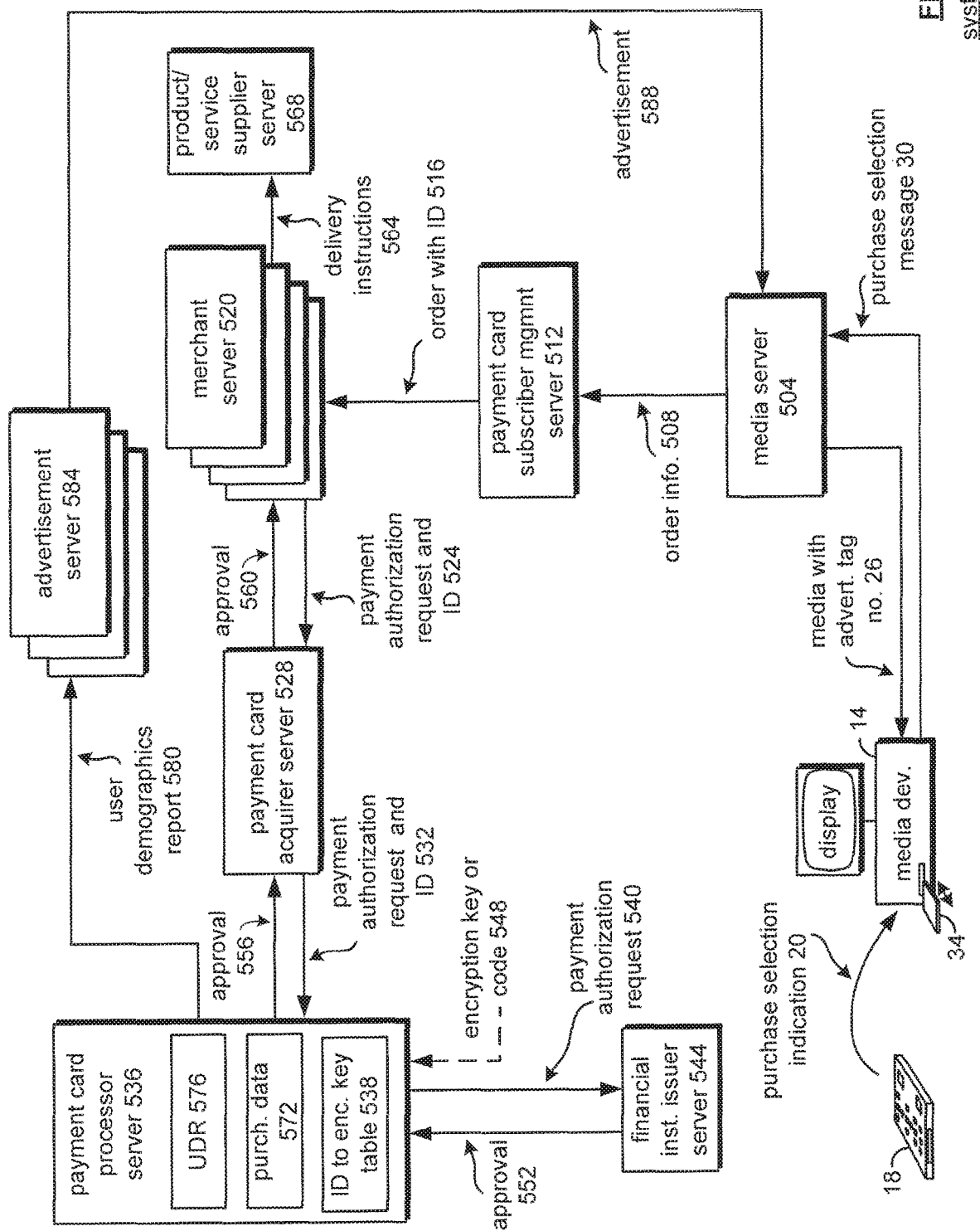
FIG. 13 is a functional block diagram of a computer system that determines whether to approve purchase authorization requests for purchase selections made through a media device and that generates purchase data related reports according to one embodiment of the invention.

FIG. 13 is a functional block diagram of a computer system that determines whether to approve purchase authorization requests for purchase selections made through a media device and that generates purchase data related reports according to one embodiment of the invention. Generally, in the embodiment of FIG. 13, system 500 is operable to conduct a media device ID through various network elements or devices to a payment card processor server to enable a payment card processor server or a payment card company server authorize a purchase transaction based in part upon the media device ID. The media device ID is an ID of a media device that generated purchase selection message 30 as described previously. Here, the media device ID is an ID of media device 14 since media device 14 is the media device that is generating purchase selection message 30 that corresponds (eventually) to a payment authorization request message that is processed by the payment card processor server of FIG. 13. In the embodiment of FIG. 13, this media device ID is transmitted in association with messages transmitted to support the purchase that corresponds to purchase selection message 30. The media device ID may be transmitted within the payment authorization request messages, for example, or in an additional message that is associated with the payment authorization request messages of system 500.

More specifically, a media server 504 produces media content including an advertisement or other tagged media content with tag number 26 to media device 14. Media device 14 displays the media content on an associated display including the advertisement. In response to receiving a purchase selection indication 20 from an associated remote control 18, for example, one that is based upon a depression of a "buy it now" button on the remote control, media device 14 generates purchase selection message 30 that includes tag number 26 identifying the tagged media content, the media device ID for media device 14 and payment account information to media server 504. The payment account information is extracted from smart card 34 which is installed or loaded within or communicatively coupled to media device 14. In one embodiment, at least a portion of the payment account information is encrypted.

While the described embodiment includes an explicit transmission of the media device ID in message 30, the ID may also be conveyed implicitly through any number of manners in which media server 504 may determine the ID of media device 14. For example, if media device 14 provides any type of unique or specific information including, for example, an identification of the media content which was received only by device 14, media server 504 may determine or identify the ID of media device 14. Alternately, if media device 14 communicates through a unique port, its ID may be determined merely by evaluating the port through which message 30 is received.

Media server 504, in the described embodiment of the invention, produces message 508 with order information to payment card subscriber management server 512 based on purchase selection message 30. The order information includes tag number 26, the encrypted payment card account information and the media device ID of media device 14. Upon receiving message 508, server 512 translates the tag number into a stock keeping unit (SKU) number with a corresponding price, verifies customer details in the payment account information, and the standing of the customer to whom the payment account belongs. Server 512 is further operable to identify and generate message 516 (an order message or message containing an order) which includes the SKU number and the price for the item the user is wishing to purchase as indicated in the purchase selection message 30. Message 516 also includes, in one embodiment, the media device ID.

Additionally, message 516 includes a shipping address associated with the user payment account that corresponds with the payment account information. Part of generating message 516 includes determining which merchant server 520 of a plurality of merchant servers 520 is to receive message 516. In one embodiment, the SKU number includes an indication of the merchant server 520 that is to receive message 516. The SKU number includes at least an electronic address, such as an IP address, to support transmission of message 516 with the order. Each merchant server 520 corresponds to one of many geographically disperse merchants.

Upon receiving message 516, merchant server 520 is operable to generate message 524 which includes a payment authorization request and the media device ID to a payment card acquirer server 528. Payment card acquirer server 528 is one that has an association with the merchant of merchant server 520 and supports payment card processing therefor. The payment authorization request of message 524 further includes the payment card account information (at least a part of which is encrypted). Server 528 is then operable to determine a corresponding payment card processor server 536 and to send message 532 to corresponding payment card processor server 536. Message 532 includes the payment authorization request and the media device ID of the media device 14 that generated purchase selection message 30. Payment card processor server 536 is a server for a payment card processing company, such as Visa, Inc., that processes payment authorization requests and communicates with a financial institution issuer server to obtain final approval for a pending transaction. Payment card processor server 536 includes structure similar to that of device 130 of FIG. 4 to support associated operations and communications.

The payment card processor server, at least in the system of FIG. 13, is operable to perform at least a partial approval of a purchase authorization request based in part upon the received media device ID. An authorized media device is one that has an established association with the payment account. Accordingly, payment card processor server 536 determines if the media device ID of the media device 14 that generated purchase selection message 30 is an authorized media device for the user payment account that corresponds to the received payment account information received in the payment authorization request of message 532. Generally, the received media device ID is used either to select an encryption key that is associated to authorized media device IDs or to compare media device IDs to as a part of determining whether to validate or partially approve a payment authorization request.

More specifically, server 536 determines whether the received media device ID corresponds to a media device ID that is associated with the user payment account (which was originally stored on smart card 34 when smart card 34 was created) in one of a plurality of approaches. Server 536 extracts the media device ID stored within the payment card account information in one embodiment. If the media device ID stored within the payment card account information corresponds to the received media device ID of the media device 14 that generated purchase selection message 30, then server 536 determines that the received media device ID of the media device 14 that generated message 30 was an authorized media device. Alternatively, server 536 may receive a plurality of authorized IDs which are stored in relation to payment account information or identifiers. Accordingly, a received ID for the media device 14 that generated message 30 can be compared to payment account information or identifiers in payment authorization request message 532.

In the described embodiment, the received ID for media device 14 (that generated message 30) is used to selection an encryption key from a table 538 that maps encryption keys to authorized media device IDs. If the selected encryption key successfully decrypts the encrypted payment account information received in message 532, then server 536 can determine media device 14 was an authorized. This determination can be implicit where traditional processing continues as long as the payment account information is successfully decrypted.

Authorization server 536 is operable, therefore, to validate the transaction by determining whether the received media device ID is an ID of a media device 14 that is authorized to generate purchase selection message 30 for the user payment card account that corresponds to the encrypted payment account information originally transmitted in purchase selection message 30. Authorization server 536 is further operable to perform traditional authorization processes to validate or approve the payment authorization request of message 532.

Upon receiving message 532, payment card processor server 536 approves or validates the payment authorization request based upon established criteria. The established criteria for such validation depend on implementation requirements that can readily be determined and implemented by one of ordinary skill in the art including, for example, account standing, remaining spending limits, etc. Server 536 is further operable to place an authorization hold on an amount that is based upon an amount specified in the payment authorization request message. Typically, an authorization hold is placed on a specified amount based an indicated transaction amount to prevent charges from exceeding specified limits such as daily limits, credit limits, etc. Such an authorization hold is typically placed when the authorization request is approved if the account status and specified transaction and credit limits allow approval of the transaction in view of account balances and other authorization holds that have not yet been settled.

Once payment card processor server 536 determines that media device 14 is an authorized media device for generating message 30, using any of the described approaches or any equivalent approach, to validate the purchase authorization request, and further determines to that purchase authorization request may be authorized using more traditional and established criteria as described above, payment card processor server 536 determines a financial institution issuer server 544 of a payment card issuer company that issued the payment card account and sends payment authorization request message 540 to financial institution issuer server 544. In one embodiment, mere transmission of the payment authorization request indicates the approval by the authorization server 536. Alternately, an express approval or denial by server 536 may be included in message 540 to enable server 544 to validate or override the determination by server 536.

After receiving message 540, financial institution issuer server 544 generates message 552 to server 536 that indicates approval (or denial) of the purchase authorization request. Server 536 then generates message 556 to server 528 which then sends message 560 to merchant server 520. Messages 556 and 560 both include the approval indication generated by server 544. Merchant server 520, upon receiving message 560, initiates delivery (assuming an approval indication) of the product or service to an address associated with the payment card account holder. In the illustrated example, merchant server 520 produces delivery instructions 564 to product service supplier server 568.

In the example shown, a message 548 that includes an encryption key or code from which an encryption key may be determined is received prior to any of the described payment card processing. The encryption key is one that corresponds to a media device that has an established association with the user payment account. More specifically, the encryption key or code is received in relation to an authorized media device ID and is stored in table 538. Message 548 containing the encryption key or code may be received from an alternate source including, for example, directly from media device 14, smart card 34, or media server 504. In one embodiment, one of smart card 34 or media device 14 established a secure tunnel with server 536 to deliver message 548. Further, in one specific embodiment, the encryption key is based upon the media device ID. Accordingly, the encryption key may be used to access payment account information when a received media device ID is for an authorized media device.

The media device ID is therefore be used as an entry to table 538 to identify an encryption key that is used to encrypt or protect the encryption information for an authorized media device for the user payment account. Based on the received media device ID, therefore, an authorization server 536 selects a corresponding encryption key which will only work to provide access to the encrypted payment account information if the media device that generated the purchase selection message 30 is an authorized media device (for the user payment account in the payment authorization request).

Because an encryption key is associated with an ID of a media device, the payment card company server 536 can determine that the media device that generated purchase selection message 30 is an authorized media device. This determination is based on the payment data being successfully decrypted. Accordingly, server 536 can therefore approve or validate the payment authorization request upon successfully decrypting the payment authorization request. In this approach, the media device ID may be considered to be implicitly embedded or contained within the payment account information.

In one specific embodiment, smart card 34, for example, initiates an encrypted communication with payment card processor server 536 to change an initially assigned encryption key for smart card 34 to a new key to perform a "key rotation." In one embodiment, the new key is associated with the media device ID to associate the smart card (and therefore, user payment account) to the media device and to define the media device as the authorized media device. In this embodiment the new key is derived from a host based master key using the media device ID as derivation data. Thus, the payment card processor server 536 and the media device 14 are able to generate a unique encryption key that is associated with the user payment account (and smart card and media device).

In the embodiment of FIG. 13, a payment card processor server 536 and financial institution server 544 work in cooperative manner to approve a payment authorization request. Here, after validating the purchase authorization requests by determining that the media device 14 is an authorized media device, processor server 536 performs traditional processing steps to approve the payment authorization request as described herein this specification. Financial institution issuer server 544 then makes a final approval determination based upon the approval of server 536. In an alternate embodiment, a server or server system that belongs to either the payment card processing company or the financial institution issuer may solely perform payment card processing and approval steps and logic described in relation to both servers 536 and 544. For any of the above approaches, however, an encryption key is stored in relation to an authorized media device ID in the described embodiment of the invention. Partially encrypted payment account information can only be decrypted, therefore, if a purchase selection message 30 was generated by an authorized media device for a user payment account whose payment account information is stored within a smart card 34 that is installed in authorized media device 14.

Payment card processor server 536 further includes purchase data block 572 for identifying and storing purchase data and a user demographics report block (UDR) 576 for generating at least one user demographics report for approved purchase transactions. The stored purchase data includes at least one of a purchase price, an item description, a merchant ID, an identification of an advertiser, and a time stamp. As may be noted, the merchant ID identifies one of a large plurality of merchants (or merchant servers 520).

Upon validating a purchase authorization request by successfully decrypting the payment account information, in the described embodiment, or alternatively, upon determining that the received media device ID is for an authorized media device, server 536 identifies a user address corresponding to the payment account information. Because the user payment account has an established association with a specific media device and because a product delivery address is included in the payment account information, server 536 can determine purchase data that is not ordinarily ascertainable. For example, because the user location is the same as the location of the media device, a specific purchase location may be determined for purchases made with the user payment account when such purchases are made through an authorized media device 14 having an associated relationship with the user payment account. Accordingly, specific demographic reports may be generated that correlate purchase data for specific products to specific areas.

In one embodiment of the invention, server 536 also receives programming or media content information. Accordingly, purchase data is correlated by demographic area to media content using media content identifiers. The media content identifiers comprise at least one of program type or specific program name or ID. Accordingly, the server 536, and more specifically, purchase data block 572 is operable to store purchase data including the user address from which a purchase is made with the user payment account and at least one of the purchase price, the item description, the merchant ID, a user descriptor, advertiser information, a time stamp, and a media content identifier.

Before, in the prior art, purchase location information was not always known or not always accurate. A purchase location for a user payment account could be either the user address (for telephone or Internet purchases) or a physical location of a store. In many cases, however, the merchant identifier might show a central franchise address and not a specific store location at which a purchase was made. Moreover, such purchases could only be loosely correlated to specific advertisements. While advertisers have been able to know, for example, that sales for a product may increase in response to an advertising campaign, a specific correlation of sales, and especially sales from a specific location, to a specific advertisement displayed on a user display device, has not been available. For example, it is not often known with accuracy that a user made a purchase from his or her home address when the purchase is made over the phone or Internet.

According to the various embodiments of the invention, better location information may be determined. Because there exists an established association between a user payment account and a media device location, as described in the various embodiments of the invention, more specific and more reliable purchase location information may be determined and stored as a part of the purchase data. For example, a correlation that may be determined between specific advertisements for a specific product that are delivered at specific times or in association with a specific media content with sales of products or services for a specific geographic area in relation to other geographic areas. Accordingly, a user demographics report may be generated to include advertising effectiveness analyses that are more specific and helpful than before. Such correlations are more specific and accurate that before.

More specifically, UDR 576 generates a user demographics report 580 based on the stored purchase data stored within purchase data block 572 and produces report 580 to at least one advertisement server 584 of a plurality of advertisement servers 584. Each of the plurality of advertisement servers 584 is associated with one of a plurality of advertisement clients that purchase advertisements for display on media device 14. Accordingly, as may be seen, one of the advertisement servers 584 generates an advertisement 588 for delivery to media server 504 for delivery to media device 14 for display for the user based, at least in part, on information within report 580. Tag number 26, which is used to identify advertisement 588, may be generated either by media server 504 or by the advertisement server 584 of the plurality of advertisement servers 584 that generated advertisement 588.

Figure 14:
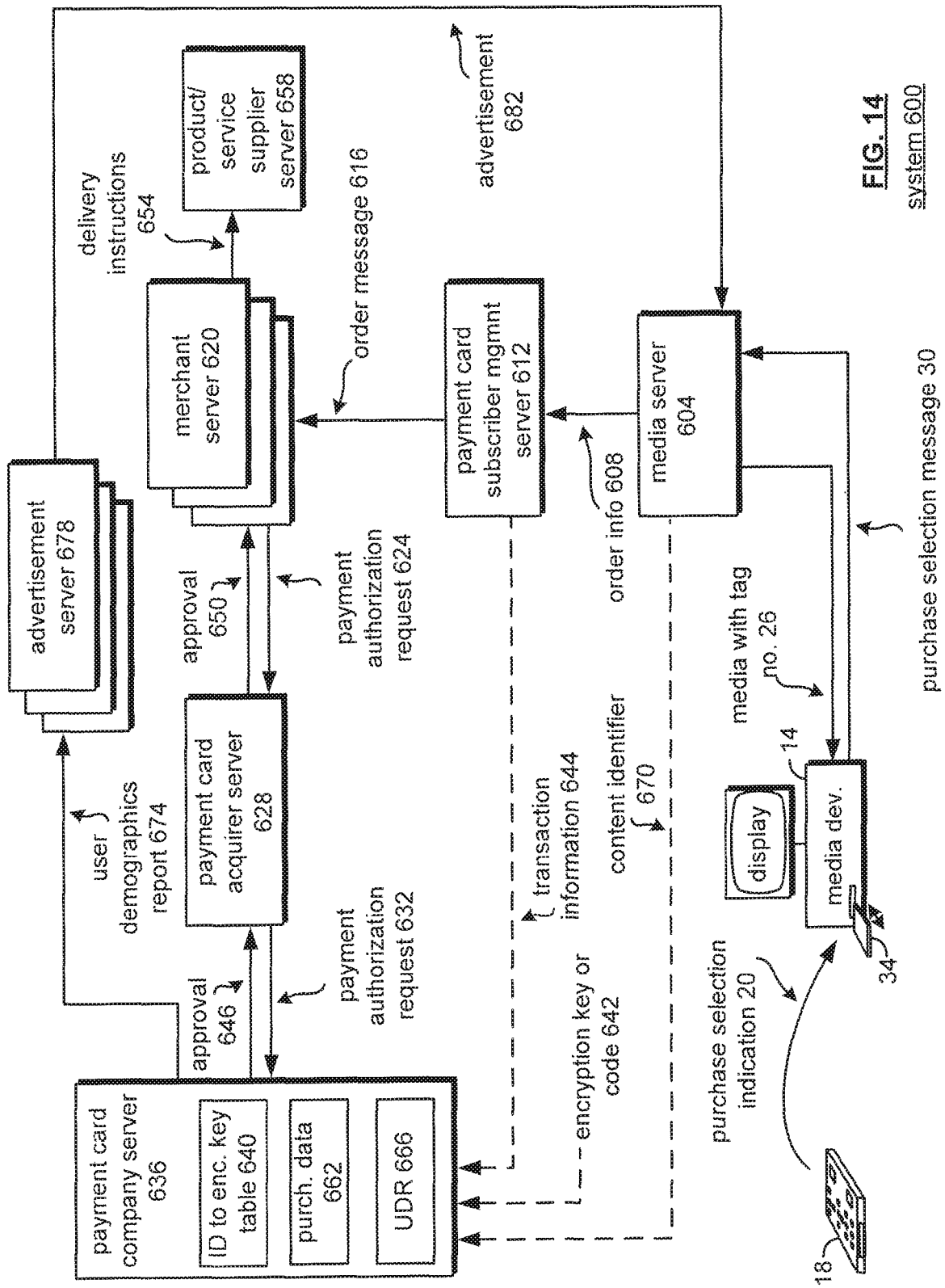
FIG. 14 is a functional block diagram of a computer system 600 that approves purchase authorizations for purchase selections made through a media device and stores and processes purchase data according to one embodiment of the invention.

FIG. 14 is a functional block diagram of a computer system 600 that approves purchase authorizations for purchase selections made through a media device and stores and processes purchase data according to one embodiment of the invention. System 600 includes media device 14, media server 604 and a payment card subscriber management server 612. Media server 604 produces media to media device 14 and receives purchase selection message 30 as described before. Media server 604 produces order information including tag number 26, payment account information and a media device ID of media device 14 in a message 608 to payment card subscriber management server 612. A media server system that comprises only one of server 604 and 612 is used in place of the two servers 604 and 612 in an alternate embodiment. Such a server system includes the functionality described for both servers performed and associated logic therefor is included.

System 600 further includes merchant server 620, a payment card acquirer server 628, a payment card company server 636 and a product/service supplier 658 configured to communicate as shown in FIG. 14. In the embodiment of FIG. 14, merchant server 620 produces a payment authorization request in message 624 to payment card acquirer server 628 which then produces message 632 that includes the payment authorization request and payment account information to corresponding payment card company server 636.

In the described embodiment, payment card company server 636 stores an encryption key in relation to an authorized media device ID for each of a plurality of user payment accounts in an ID to encryption key mapping table 640. As described in relation to FIG. 13, table 640 is populated by receiving one or more messages 642 that include an encryption key or code that is associated with a user payment account. Message 642 and its generation are similar to that described in FIG. 13 for message 548. Table 640 is then used to determine if media device 14 is an authorized media device for the user payment account when message 632 with a payment authorization request is received.

In the described embodiment, payment card company server 636 receives transaction information in a message 644. The transaction information in message 644 includes the media device ID of media device 14 and an identification of a corresponding payment authorization request that is received in message 632. Accordingly, when message 632 is received with the corresponding payment authorization request, server 636 determines the ID of media device 14 that generated message 30 that corresponds to payment authorization request message 632. The media device ID is then used as an entry to table 640 to select an encryption key. If the selected encryption key successfully decrypts the encrypted payment account information in message 632, then media device 14 is the authorized media device and server 636 may additionally perform routine payment authorization request processing (as described in greater detail in relation to FIG. 13). Server 636 then generates approval 646 to server 628 which then generates approval 650 to merchant server 620. This described operation is similar to that described before.

More specifically, a media server 604 produces tagged media content with tag number 26 that identifies the tagged media content to media device 14. In response to receiving purchase selection indication 20 from an associated remote control 18, media device 14 generates purchase selection message 30 that includes tag number 26 for identifying the tagged media content, a media device ID, and payment account information to media server 604. Here, purchase selection indication 20 corresponds, for example, to depression of a "buy it now" button on remote control 18. The payment account information is extracted from smart card 34 which is installed or loaded within media device 14.

When media server 604 receives purchase selection message 30, media server 604 transmits tag number 26, payment account information and the media device ID of media device 14 in a message 608 to payment card subscriber management server 612. Server 612 then determines a merchant server that corresponds to a SKU number and transmits an order message 616 to merchant server 620. Message 616 includes, in one embodiment, the SKU number, price and payment account information.

Upon receiving message 608, server 612 is operable to translate the tag number into a SKU number with a corresponding price, to verify customer details in the payment card account information, and the standing of the customer to whom the payment card account belongs. Server 612 is further operable to identify and generate message 616 which includes the SKU number and the price for the product or service the user is wishing to purchase when the purchase selection message 30 was generated (the product or service corresponding to the tag number). Part of generating message 616 includes identifying which merchant server 620 is to receive message 616. In one embodiment, the SKU number includes an identification of the merchant server 620. Merchant server 620 is a server that is operated by one of a large number of geographically dispersed merchants.

Upon receiving message 616, merchant server 620 is operable to generate message 624 which includes the payment authorization request to a payment card acquirer server 628. The authorization request of message 624 further includes the payment account information. Server 628 is then operable to determine a corresponding payment card company server 636 based on the payment account information and to send message 632 to the corresponding payment card company server 636. Message 632 includes the payment authorization request. Payment card company server 636 can be any combination of servers of payment card account processing and issuer company servers as describe before in relation to payment card company servers.

Once the payment authorization request is approved, payment card company server 636 sends message 646 to server 628 which then sends message 650 to merchant server 620. Messages 646 and 650 both include the approval indication. Merchant server 620, upon receiving message 650, initiates delivery of the product or service to an address associated with the payment card account holder. In the illustrated example, merchant server 620 produces delivery instructions 654 to product/service supplier server 658. Message 646 containing the approval indication is generated for delivery to merchant server 620 by way of one or more servers though message 646 may also be transmitted directly to merchant server 620.

Generally, in the embodiment of FIG. 13 described previously, a media server 504 of computer system 500 is operable to transmit the media device ID through a plurality of network devices including the merchant server 520 and the acquirer server 528 to payment card processor server 536 for a specified transaction for comparison to an authorized media device ID. Here in FIG. 14, however, payment card subscriber management server 612 transmits an order message 616 which includes the SKU number, the price, the payment account information but not the media device ID of media device 14. Accordingly, servers 620, 628 and 636 do not receive or transmit the media device ID in relation to a specific transaction for the purpose of authorizing or settling such transactions as was shown in relation to FIG. 13. Rather, as described in more detail above, message 644 is transmitted to server 636 with the media device ID and an ID or other information that corresponds to message 632 to allow server 636 to identify the associated purchase transaction request 632 when received.

Upon receiving message 632, therefore, payment card company server 636 is operable to determine whether to approve or deny the authorization request received in message 632 using traditional approval logic for payment card processing servers and issuer company servers as known by one of average skill in the art if the media device ID corresponds to the authorized media device ID for the user payment account that corresponds to the payment account information received in message 632. While the described embodiment includes an encryption key to authorized media device ID table 640, it should be understood that other approaches may be used as described in relation to FIG. 13. Instead of determining an ID is for an authorized media device by successfully decrypting payment account information, for example, server 636 merely compares the received media device ID to an authorized media device ID for the payment account information in message 632 in an alternate embodiment.

One reason transmission of the media device ID in relation to messages 616, 624 and 632 is not required is that server 636 receives message 642 with the media device ID and information to identify an associated payment authorization request. By receiving message 642, server 636 is able to validate the purchase transaction by determining that media device 14 is authorized to transmit purchase selection messages 30 for the user payment account. Accordingly, servers 620-636 merely operate in a traditional manner even though server 636 requires the media device ID to complete the approval process.

Payment card processor server 636 further includes purchase data storage block 662 for identifying and storing purchase data and a user demographics report (UDR) block 666 for generating at least one user demographics report. The stored purchase data stored within block 662 includes at least one of a purchase price, an item description, a merchant ID, an identification of an advertiser, and a time stamp. As may be noted, the merchant ID identifies one of a large plurality of merchants (or merchant servers 620). In the described embodiment, media server 604 transmits a message 670 that includes a content identifier to server 636. The content identifier of message 670 also includes a transaction identification to enable server 636 to correlate the content identifier of message 670 with a specific transaction.

In an alternate embodiment, the content identifier of message 670 is transmitted from server 604 to server 612. Server 612 then includes the content identifier with the transaction information 644. In yet another embodiment, the content identifier is included within messages 608, 616, 624 and 632 and is propagated through system 600 with the various purchase transaction related messages 608, 616, 624 and 632. For any of these embodiments, the content identifier or content identification information is stored with the purchase data in purchase data storage block 662.

UDR block 666, as described in relation to UDR block 576 of FIG. 13, generates user demographics reports 674 that are transmitted to at least one of a plurality of advertisement servers 678. At least one advertisement server 678 then generates an advertisement 682 which is transmitted to media server 604 for display on media device 14. In at least one embodiment of the invention, server 636 targets specific advertisement servers 678 based upon the contents of the user demographics report 674 and sends report 674 to the targeted servers 678.

FIG. 14 illustrates a plurality of aspects of the embodiments of the invention that may be combined with various aspects of the embodiments of the invention illustrated in FIG. 13. For example, FIG. 13 illustrates that the media device ID of the media device 14 that originated the purchase selection message is transmitted in association with the purchase authorization request (and other associated messages) for validation by a payment card processor server 536 while FIG. 14 shows an alternate approach for delivering the media device ID to a payment card company server 636. Either approach for delivering the media device ID may be used for either a processor server 536 or payment card company server 636.

Figure 15:
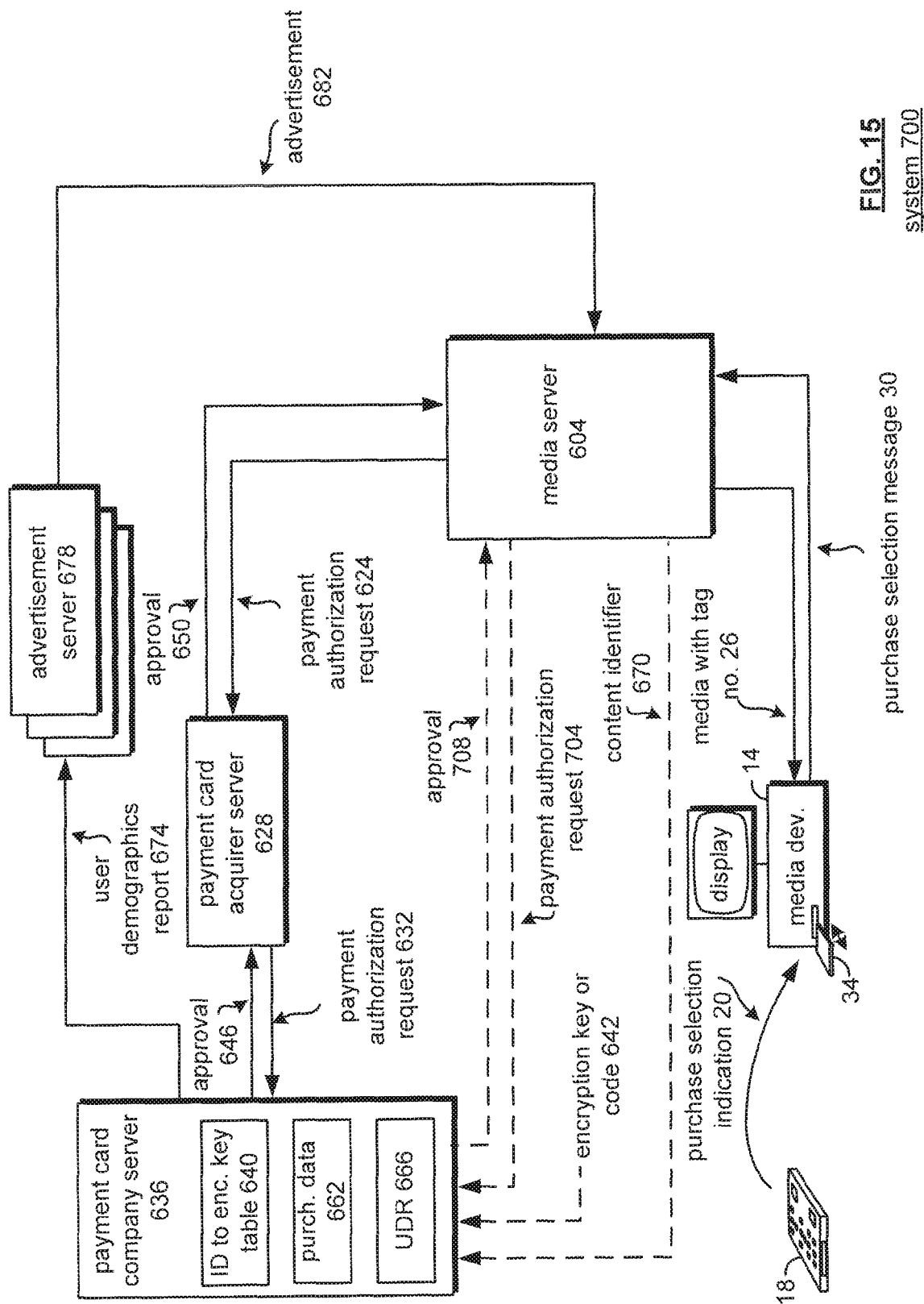
FIG. 15 is a functional block diagram of a system for delivering media content and storing purchase data according to one embodiment of the invention wherein the media server operates as a merchant server for purchased media content.

FIG. 15 is a functional block diagram of a system for delivering media content and storing purchase data according to one embodiment of the invention wherein the media server operates as a merchant server for purchased media content. Generally, system 700 has many common elements with system 600 of FIG. 14. Accordingly, most commonly numbered elements or messages won't be described again in relation to FIG. 15. System 700 is one in which the media server 604 is acting as a merchant server 620 in relation to media content that may be purchased. Accordingly, media server 604 generates payment authorization request message 624 to server 628 and receives approval 650 from server 628 as described in relation to FIG. 14.

Alternatively, media server 604 may transmit a payment authorization request message 704 directly to payment card company server 636 to receive approval 708 (also directly from server 636). In this embodiment, a content identifier may be a part of the information in message 704 or may be sent separately in message 670. Additionally, the purchase data 662 may include purchase data for the purchases of media content associated with messages 624 or 628 in addition to other purchase data as described in relation to FIGS. 13 and 14. Accordingly, user demographics report 674 is not limited to types of transactions in which media servers such as server 604 operate as a merchant 620 of FIG. 14. Thus, advertisements 682 are not limited to advertisements for media content. The topology and signal flows of FIG. 15 may therefore be overlaid with other topologies such as those shown in FIGS. 13 and 14.

Figure 16:
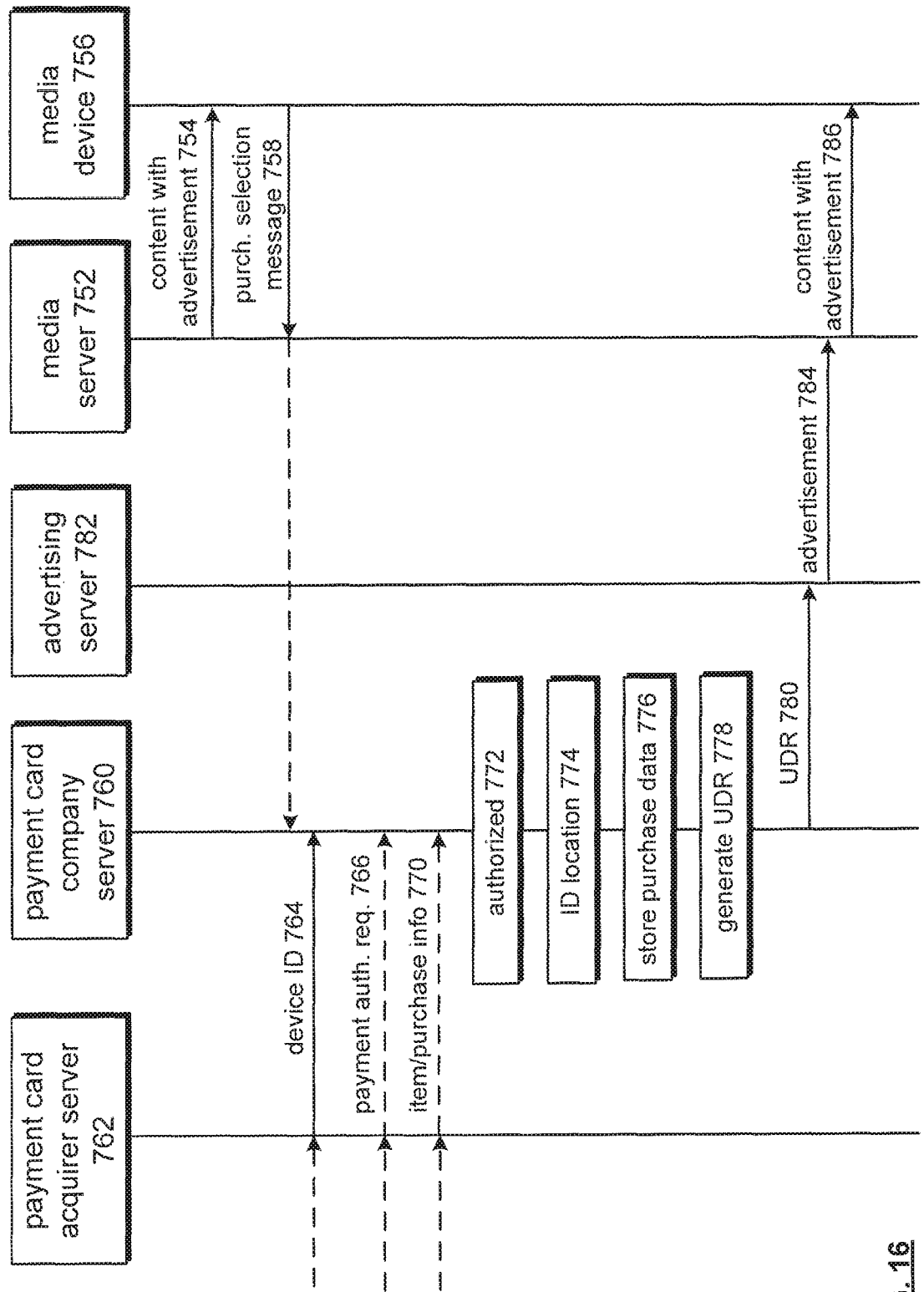
FIG. 16 is a signal flow diagram according to one embodiment of the invention.

FIG. 16 is a signal flow diagram for a system 750 according to one embodiment of the invention. System 750 includes a media server 752 that produces media content with at least one advertisement 754 to a media device 756 for display. Subsequently, server 752 receives purchase selection message 758 (or at least the contents of message 758 originally transmitted from media device 756 in a subsequent message). Transaction information from purchase selection message 758 is ultimately delivered to payment card company server 760 through one or more messages. For example, the transaction information may be delivered by way of a plurality of servers and messages such as merchant servers, acquirer servers such as payment acquirer server 762, etc., as described previously or, alternatively, directly through specific communication (e.g. a tunneled communication). Payment card company server 760 comprises at least one of a payment card processor server (e.g., a server for a payment card processing company such as Visa, Inc.) or a financial institution issuer server (a server of a bank or other payment card issuer).

Payment card company 760 further receives a device ID in a message 764 from payment acquirer server 762 or from another server or device such as media server 752 or media device 756 or from a subscriber management server (not shown in FIG. 15) wherein the ID corresponds to and is associated with the purchase selection message 758. Payment card company server 760 may thus receive a payment authorization request in message 766 from payment card acquirer server 762 or from an alternate source such as media server 752. Similarly, payment card company server 760 may receive item and purchase information in message 770 from payment card acquirer server 762 or from another source such as servers 752 and/or 756.

In one embodiment, the purchase information is received in a plurality of messages from a plurality of sources and may include content information that identifies content being displayed or played as shown at 754. The purchase information within these messages is not required to be received in one message from one source. For example, in one embodiment, media server 752 may provide content information while payment card acquirer server 762 provides purchase information 770 relating to the specific product being purchased in the payment authorization request. The payment authorization request with purchase data may also be received from the media server 752. The payment account information which includes a user address may be received at least partially from media server 752 or even through a tunneled communication from media device 756 or from a smart card such as smart card 34 (not shown here but as shown in previous figures) which is communicatively coupled to media device 756.

Server 760 determines if media device 756 is authorized (block 772) and identifies a location of the media device (block 774) and the purchase location (block 776). If media device 756 is an authorized media device for the user payment account, server 760 stores purchase data (block 776) and generates a user demographics report (block 778). A UDR is then transmitted in message 780 to advertising server 782. As an alternate approach to transmitting the UDR in message 780, server 760 may also produce the report for physical delivery or for delivery in a form other than an electronic transmission to an advertising entity associated with server 782. Based upon the UDR, server 782 generates an advertisement 784 that is delivered to server 752. Server 752 then produces signal/message 786 that includes content with advertisement 784 for display on media device 756. The content typically includes streaming video and/or audio information.

Figure 17:
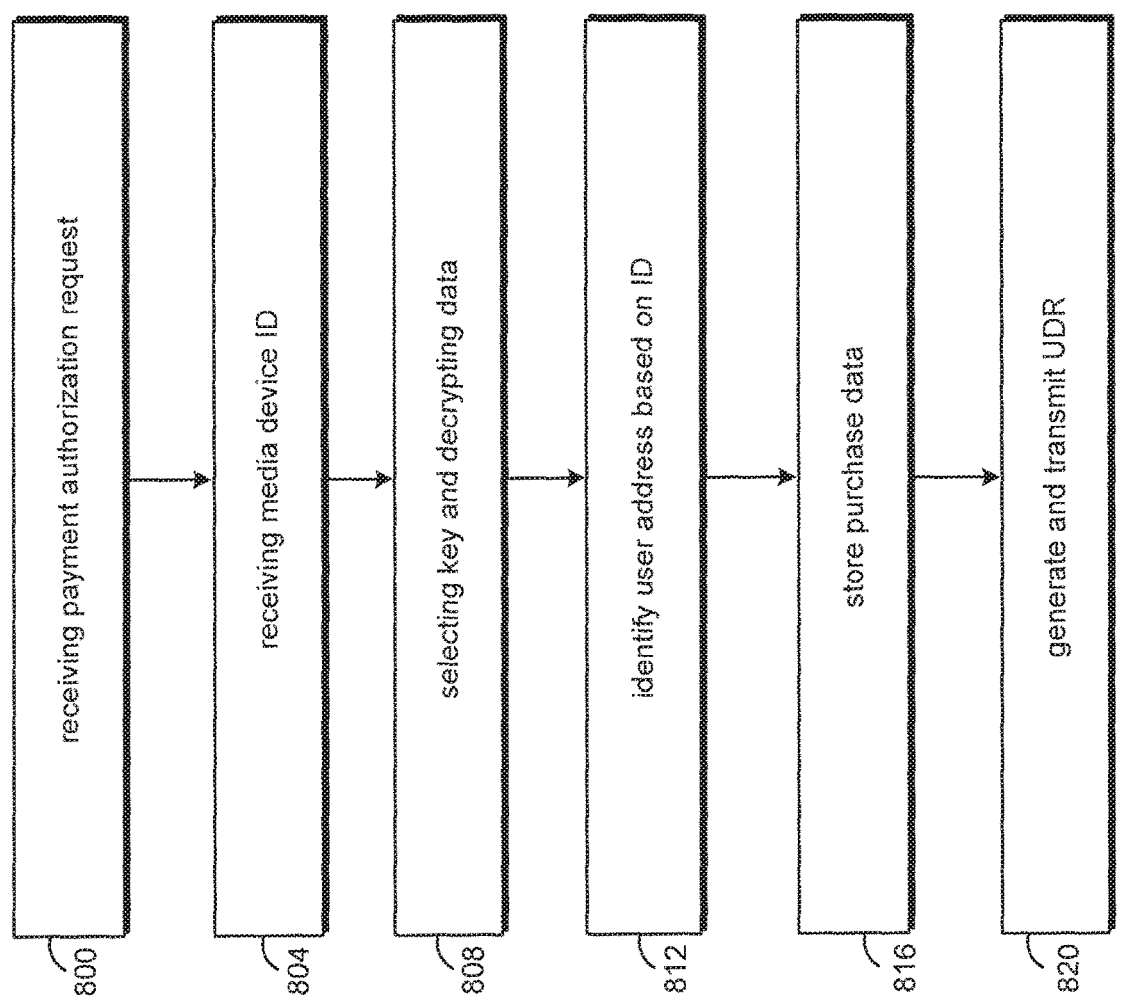
FIGS. 17-18 are flow charts that illustrate a method according to one or more embodiments of the invention for processing a purchase transaction and for storing purchase data.

FIG. 17 illustrates a method according to one embodiment of the invention for processing a purchase transaction. The method includes receiving a payment authorization request message (step 800) that corresponds to a purchase selection message generated by a media device to purchase an item, is for a user payment account that is associated with the media device and includes encrypted payment account information. This step 800 includes also receiving at least one of a purchase price, an item description, a merchant ID, an identification of an advertiser, a content identifier and a time stamp. This information is received in association with the payment authorization request though it is not necessarily received with the payment authorization request.

The method further includes receiving a media device ID (step 804) corresponding to the media device that generated the purchase selection message, selecting an encryption key based upon the received media device ID, and decrypting the payment account information using the selected encryption key (step 808). Upon successfully decrypting the payment account information, the method includes identifying a user address based on the media device ID (step 812) corresponding to the decrypted payment account information and storing purchase data (step 816) including storing the user address and at least one of the purchase price, the item description, the merchant ID, a user descriptor, advertiser information, the time stamp and the content identifier.

Once such data is stored, the method includes generating and transmitting a user demographics report (step 820) that includes at least a portion of the stored purchase data that corresponds to the at least one demographic area. The user demographics report identifies advertisement effectiveness in relation to the purchase data. The method may further include processing the user demographics report to identify one of a plurality of advertisers having sales that correspond to the user demographics report and transmitting the user demographics report to an advertisement server to support push adds based on the user demographics report corresponding to the at least one demographic area.

As described above, one aspect of the method includes also receiving a media content identifier that corresponds to media being presented by the media device at a time the purchase selection message was generated by the media device. Thus, the method further includes identifying purchase data in relation to the media content identifier for at least one demographic area.

Figure 18:
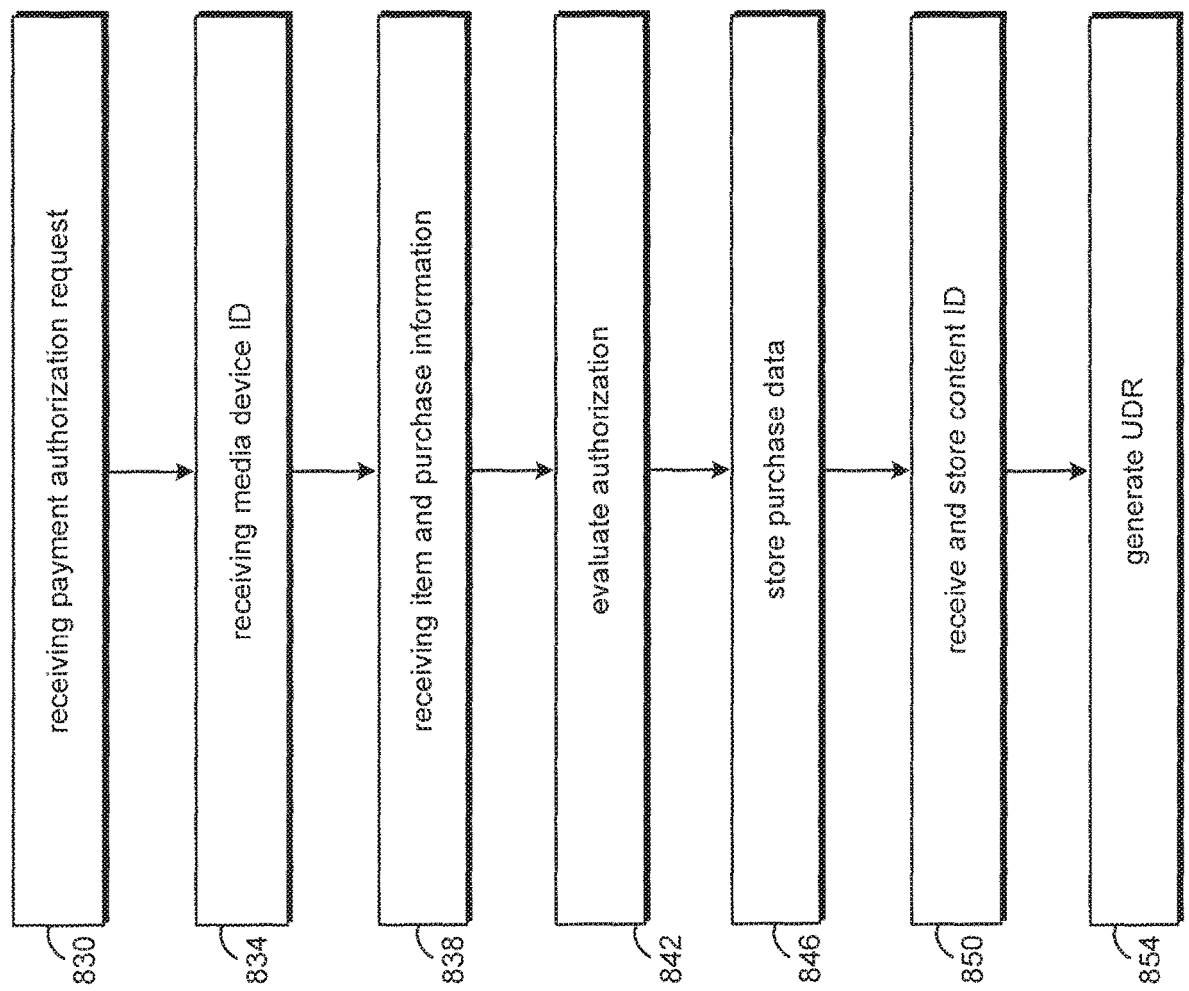

FIG. 18 is a flow chart that illustrates a method in a payment company server according to one embodiment of the invention. The method includes receiving a payment authorization request message (step 830) that corresponds to a purchase selection message generated by a media device in response to an item advertised within media content wherein the payment authorization message includes encrypted payment account information. The method further includes receiving a media device ID corresponding to the media device that generated the purchase selection message (step 834) and receiving item and purchase information in association with the payment authorization request message (step 838).

The method further includes determining whether the media device is an authorized media device for a user payment account that corresponds to the payment account information (step 842) and, if so, identifying a purchase location based upon the media device ID and storing the item and purchase information in association with a known location of the media device (step 846). Here, the user address is the known location of the media device and, therefore, the purchase location.

The item and purchase information includes at least one of a purchase price, an item description, a merchant ID of a plurality of geographically disperse merchants and a time stamp. In one embodiment, the method optionally includes receiving content identification for the media content being displayed at a time the purchase selection message was generated (step 850). The content identification identifies at least one of a media content tag number to identify advertised items and program identification information.

The method of claim 18 further includes generating a user demographics report (step 854) that defines at least one demographic area that includes the user address and includes an analysis based on at least a portion of the stored purchase data that corresponds to the at least one defined demographic area. The analysis of the user demographics report correlates the stored item and purchase information in relation to the at least one demographic area in relation to the content identification. The method further includes processing the user demographics report to identify one of a plurality of advertisers having sales that correspond to the user demographics report.

The step of determining whether the media device is an authorized media device for a user payment account that corresponds to the payment account information includes determining the media device ID compares favorably to an ID for the authorized media device in one embodiment. Alternately, determining the media device is an authorized media device for a user payment account that corresponds to the payment account information includes selecting an encryption key based upon the received media device ID and successfully decrypting the payment account information using the selected encryption key.

FIG. 19 is a functional block diagram of a system for generating user data reports according to one embodiment of the invention. A system 900 includes a payment card company server 904 that includes table 908 for mapping encryption keys to authorized media devices IDs, user demographics report block 912 for generating user demographics reports, and data storage block 916 for storing purchase data including content identification information and purchase location information. Payment card company server 904 comprises at least one of a payment card processor server (e.g., a server for a payment card processing company such as Visa, Inc.) or a financial institution issuer server (a server of a bank or other payment card issuer).

Without substantially repeating what has been said in relation to the prior figures, server 904 receives a media device ID in a message 920 from one of a plurality of sources to identify the media device that generated a purchase selection message that included payment account information. Payment card company server 904 then validates or approves a purchase transaction based in part on the media device ID.

Payment card company server 904 also receives purchase data and media content information 924 (e.g., a name, a category, or a specific content ID) from a media server 928. The purchase data and content information may be received in separate message, from separate sources, or together in a single message. Further, server 904 receives advertiser information 932 that corresponds to a plurality of advertisers that correspond, for example, to advertisement servers 936. The information includes product listings and categories. The information 932 may be received from the plurality of advertisers 936 or may be received from another server that includes a database with researched data. Finally, as may be seen, a plurality of media servers 928 are coupled to receive at least one advertisement 940 from at least one of a plurality of the advertisement servers 936 as well as media content 944 from at least one of a plurality of media content sources 948. The advertisement 940 may include specific parameters that are requested for association with the advertisement 940. For example, advertisement 940 may include a request for content delivery. For example, a request may be made for the advertisement to be displayed with specified content, within specified geographic areas, to specified types of users, or within a specified time frame, etc.

In at least one embodiment, a large plurality of media content sources 948 is operable to deliver media to media server 948 for delivery to media devices. Accordingly, media content information or IDs include media source information in addition to media content category information and specific media content title information. The advertisement 940, in one embodiment, therefore includes an identification of media content with which the media advertisement is to be displayed. The media content may be identified by any one of media source information, media content category information and specific media content title information. Accordingly, advertising processing logic 952 of server 928 generates media content 956 with advertisements that correspond to advertisement 940.

Data storage block 916 stores advertiser information 932, purchase data and media content identification 924 information (or IDs). UDR block 912, therefore, generates user demographic reports 960 that may be targeted to specific advertisers and/or products in relation to specific geographic areas. The targeted reports and specific user information therein provide to at least one advertisement server 936 data necessary to produce advertisement 940 with any specific display requests.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof. For example, each device, server or system described in relation to the Figures in the present specification may include, in one or more embodiments, one or more of the structural elements in a configuration similar to that of device 130 of FIG. 4 to support associated operations and communications as described in relation to the various figures.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a message but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, messages, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

What is claimed is:

1. A method, comprising:
receiving, by a payment card processor server computer, a payment authorization request message, the payment authorization request message being generated in response to a purchase selection message, wherein the payment authorization request message includes encrypted payment account information and at least one of a purchase price, an item description, a merchant ID, an identification of an advertiser, and a time stamp;
receiving, by the payment card processor server computer, a media device ID associated with a media device that generated the purchase selection message, wherein the media device is associated with a user payment account;
determining the encrypted payment account information from the received payment authorization request message, the encrypted payment account information having been retrieved from a smart card coupled to the media device;
selecting, by the payment card processor server computer, an encryption key based upon the media device ID;
decrypting, by the payment card processor server computer, the encrypted payment account information using the encryption key to generate decrypted payment account information;
extracting, by the payment card processor server computer, a user address from the decrypted payment account information; and
storing, by the payment card processor server computer, purchase data including the user address and at least one of the purchase price, the item description, the merchant ID, a user descriptor, advertiser information and the time stamp, wherein the user address is stored as a purchase location.

2. The method of claim 1 further including:
generating a user demographics report using at least a portion of the stored purchase data; and
defining at least one demographic area that includes the user address, wherein the generated user demographics report includes at least a portion of the stored purchase data that corresponds to the at least one demographic area.

3. The method of claim 2 further including transmitting the user demographics report to an advertisement server to support dissemination of an advertisement based on the user demographics report corresponding to the at least one demographic area.

4. The method of claim 1 further including:
generating a user demographics report using at least a portion of the stored purchase data; and
processing the user demographics report to identify one of a plurality of advertisers having sales that correspond to the user demographics report.

5. The method of claim 1 further including:
generating a user demographics report using at least a portion of the stored purchase data, wherein the user demographics report identifies advertisement effectiveness in relation to the purchase data.

6. The method of claim 1 further including receiving a media content identifier that corresponds to media being presented by the media device at a time the purchase selection message was generated by the media device.

7. The method of claim 6 further including identifying purchase data in relation to the media content identifier for at least one demographic area.

8. The method of claim 1 wherein the purchase selection message is for purchasing media content.

9. The method of claim 1 wherein the payment authorization request message is generated by a merchant server.

10. The method of claim 1 further comprising:
determining that the media device that generated the purchase selection message is an authorized media device, wherein the determination is made upon successfully decrypting the encrypted payment account information using the encryption key.

11. The method of claim 1 further comprising:
generating a user demographics report using at least a portion of the stored purchase data, wherein the user demographics report defines at least one demographic area that includes the user address and includes an analysis based on at least a portion of the stored purchase data that corresponds to the at least one defined demographic area.

12. The method of claim 1 further comprising:
generating a user demographics report using at least a portion of the stored purchase data; and
providing the user demographics report to at least one advertisement server, wherein an advertisement is generated based on the demographics report and provided to one or more media devices for display.

13. A payment card company system, comprising:
one or more processors; and
memory coupled to the one or more processors wherein the one or more processors is operable to:
receive a payment authorization request message that is generated in response to a purchase selection message, wherein the payment authorization message includes encrypted payment account information and at least one of a purchase price, an item description, a merchant ID, an identification of an advertiser, and a time stamp;
receive a media device ID associated with a media device that generated the purchase selection message, wherein the media device is associated with a user payment account;
determine the encrypted payment account information from the received payment authorization request message, the encrypted payment account information having been retrieved from a smart card coupled to the media device;
select an encryption key based upon the media device ID;
decrypt the encrypted payment account information using the encryption key;
upon successfully decrypting the encrypted payment account information, identify a user address from the decrypted payment account information; and
store purchase data including the user address and at least one of the purchase price, the item description, the merchant ID, a user descriptor, advertiser information, and the time stamp, wherein the user address is stored as a purchase location.

14. The payment card company system of claim 13 wherein the one or more processors is further operable to:
generate a user demographics report using at least a portion of the stored purchase data; and
define at least one demographic area that includes the user address, wherein the generated user demographics report includes at least a portion of the stored purchase data that corresponds to the at least one demographic area.

15. The payment card company system of claim 14 wherein the one or more processors is further operable to:
generate a user demographics report using at least a portion of the stored purchase data; and
transmit the user demographics report to an advertisement server to support dissemination of an advertisement based on the user demographics report corresponding to the at least one demographic area.

16. The payment card company system of claim 13 wherein the one or more processors is further operable to:
generate a user demographics report using at least a portion of the stored purchase data; and
identify one of a plurality of advertisers having sales that correspond to the user demographics report.

17. The payment card company system of claim 13 wherein the one or more processors is further operable to identify advertisement effectiveness in relation to the purchase data.

18. The payment card company system of claim 13 wherein the one or more processors is further operable to receive a media content identifier that corresponds to media being played for a user at a time the purchase selection message was generated by the media device, the user associated with the media device that generated the purchase selection message.

19. The payment card company system of claim 18 wherein the one or more processors is further operable to generate a user demographics report using at least a portion of the stored purchase data, and wherein the user demographics report identifies purchase data in relation to at least one content identifier for the at least one demographic area.

20. The payment card company system of claim 13 wherein the payment card company system comprises a payment card processor server and a payment card issuer server.

21. The payment card company system of claim 13 wherein the one or more processors is further operable to:
determine that the media device that generated the purchase selection message is an authorized media device, wherein the determination is made upon successfully decrypting the encrypted payment account information using the encryption key.

22. The payment card company system of claim 13 wherein the one or more processors is further operable to generate a user demographics report using at least a portion of the stored purchase data, and wherein the user demographics report defines at least one demographic area that includes the user address and includes an analysis based on at least a portion of the stored purchase data that corresponds to the at least one defined demographic area.

23. The payment card company system of claim 13 wherein the one or more processors is further operable to:
generate a user demographics report using at least a portion of the stored purchase data; and
provide the demographics report to at least one advertisement server, wherein an advertisement is generated based on the demographics report and provided to one or more media devices for display.

* * * * *